BEST AVAILABLE COPY

A. CALLESON.

BOTTLE FILLING AND SEALING MACHINE.

APPLICATION FILED MAR. 30, 1918.

Reissued June 10, 1919.

14,657.

14 SHEETS—SHEET 1.

WITNESS:

Wm. Wrell.

INVENTOR,

Amos Calleson,

BY

John Lindsay,

ATTORNEY.

A. CALLESON.
BOTTLE FILLING AND SEALING MACHINE.
APPLICATION FILED MAR. 30, 1918.
Reissued June 10, 1919.
14,657.
14 SHEETS—SHEET 2.
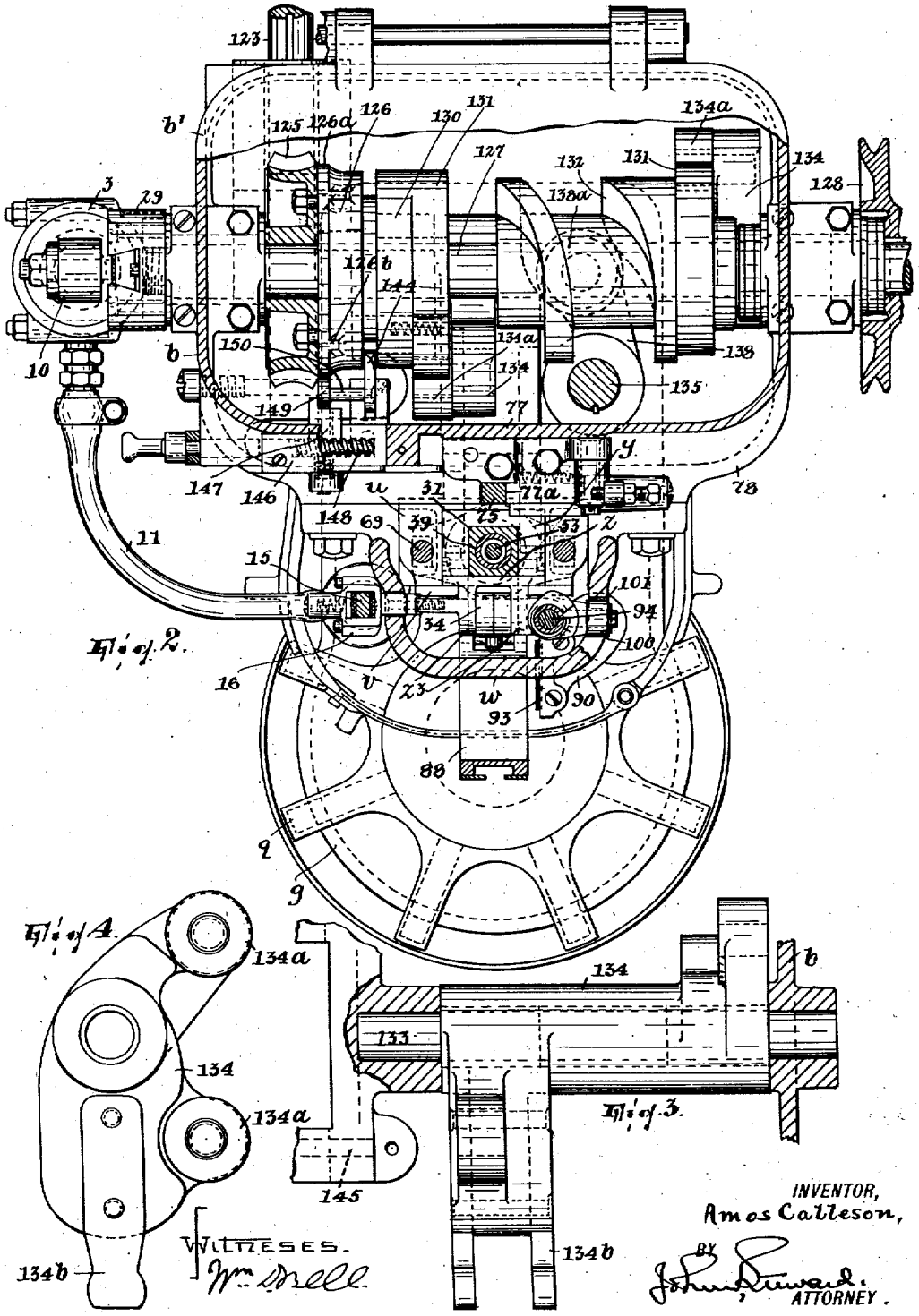
INVENTOR,
Amos Calleson,
BY
John Ewart
ATTORNEY.
WITNESSES.
Wm. Snell

A. CALLESON.

BOTTLE FILLING AND SEALING MACHINE.

APPLICATION FILED MAR. 30, 1918.

Reissued June 10, 1919.

14,657.

14 SHEETS—SHEET 3.

WITNESS:

Wm. Grell.

INVENTOR,

Amos Calleson,

BY

J. Bernard,

ATTORNEY.

A. CALLESON.

BOTTLE FILLING AND SEALING MACHINE.

APPLICATION FILED MAR. 30, 1918.

Reissued June 10, 1919.

14,657.

14 SHEETS—SHEET 4.

WITNESS:

Wm. Bell

INVENTOR,

Amos Calleson,

BY

John Stewart,

ATTORNEY.

A. CALLESON.
BOTTLE FILLING AND SEALING MACHINE.
APPLICATION FILED MAR. 30, 1918.
Reissued June 10, 1919.
14,657.
14 SHEETS—SHEET 5.
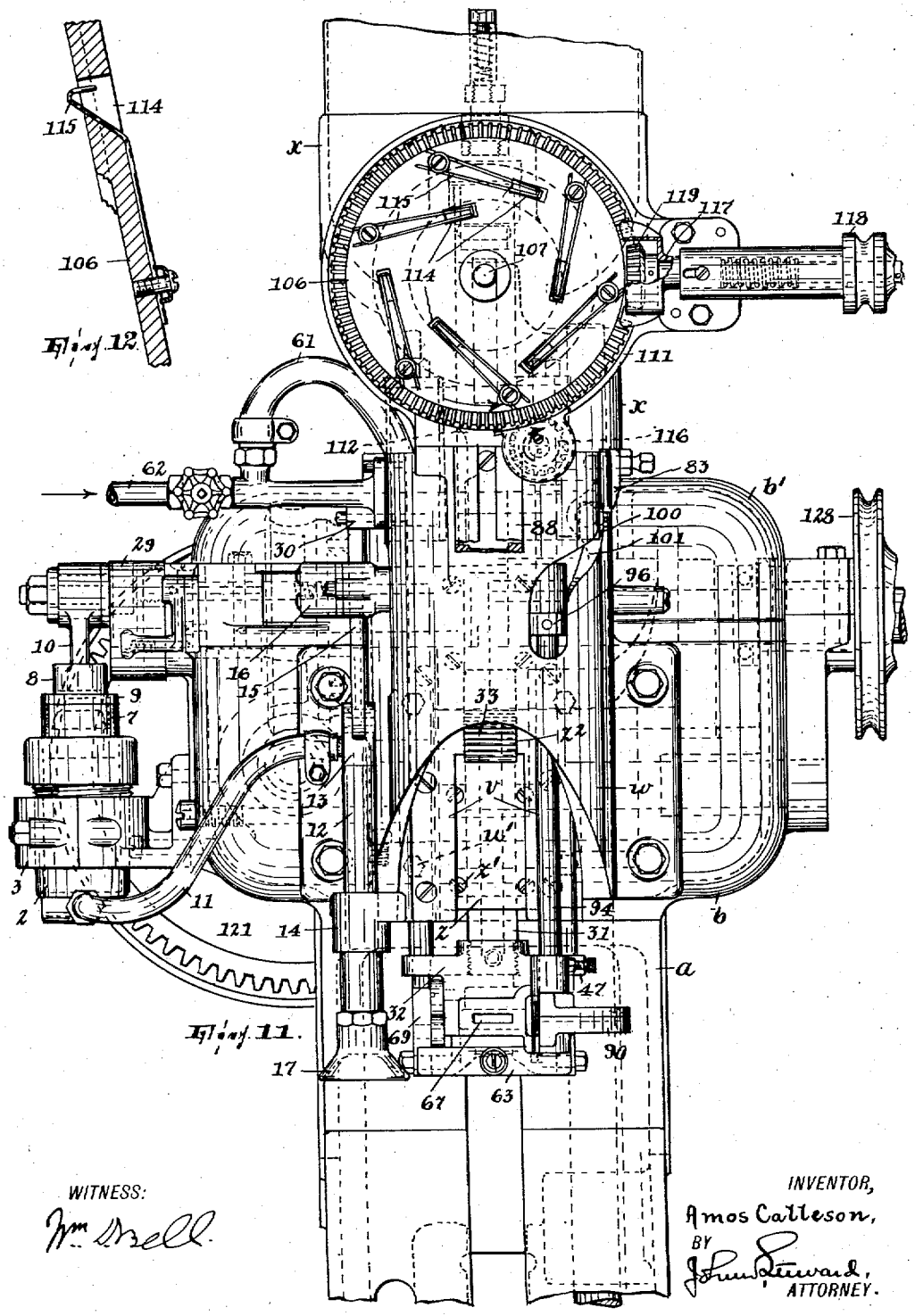
WITNESS:
Wm. Bell.
INVENTOR,
Amos Calleson,
BY
John Stewart,
ATTORNEY.

A. CALLESON.
BOTTLE FILLING AND SEALING MACHINE.
APPLICATION FILED MAR. 30, 1918.
Reissued June 10, 1919.
14,657.
14 SHEETS—SHEET 6.
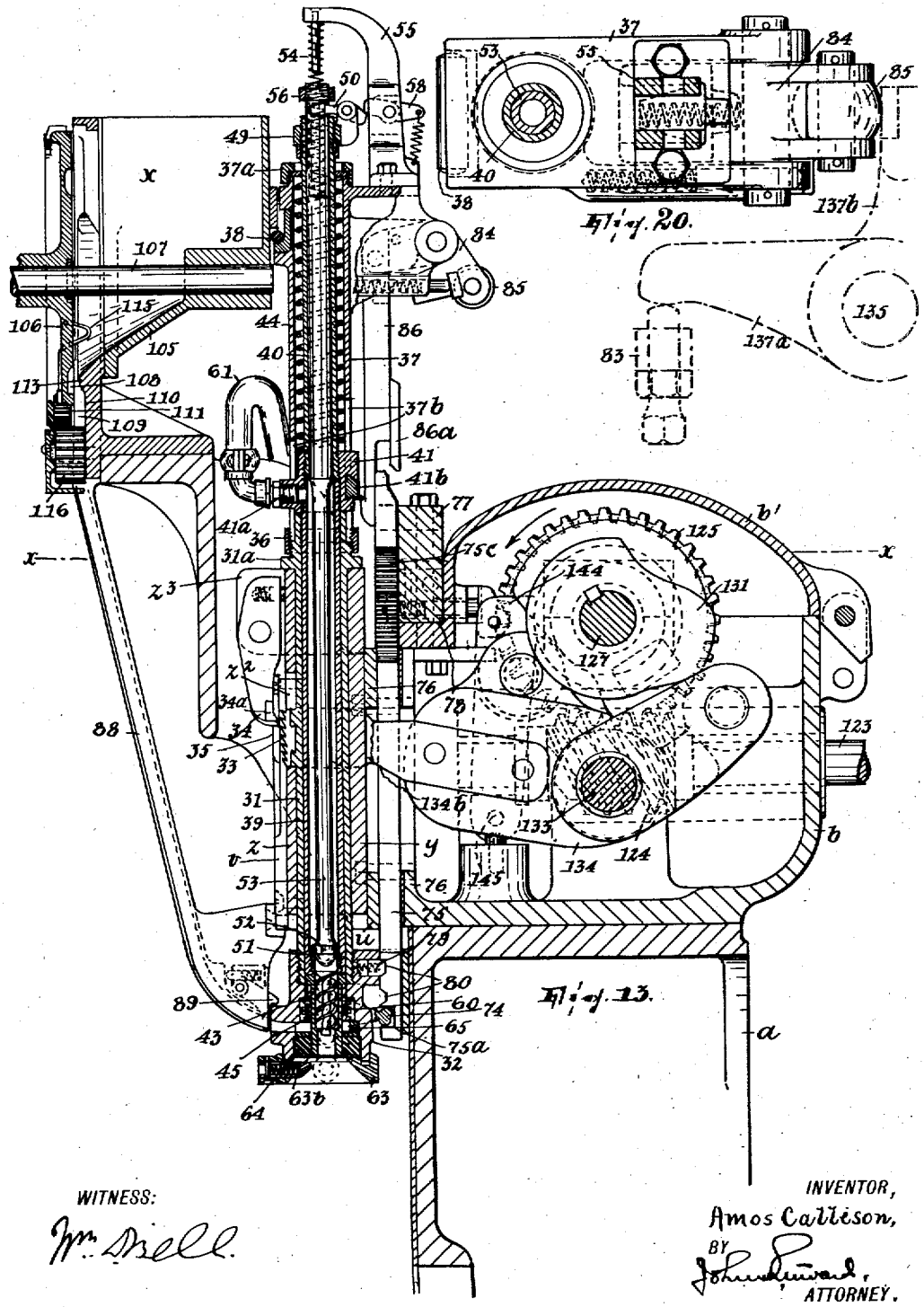
WITNESS:
Wm. Bell.
INVENTOR,
Amos Calleson,
BY
John Ewart,
ATTORNEY.

A. CALLESON.

BOTTLE FILLING AND SEALING MACHINE.

APPLICATION FILED MAR. 30, 1918.

Reissued June 10, 1919.

14,657.

14 SHEETS—SHEET 7.

Witness
Jno. Wall.

Inventor,
Amos Calleson,
BY
John Sumner, ATTORNEY.

A. CALLESON.

BOTTLE FILLING AND SEALING MACHINE.

APPLICATION FILED MAR. 30, 1918.

Reissued June 10, 1919.

14,657.

14 SHEETS—SHEET 8.

WITNESS:

Wm. Bell.

INVENTOR,

Amos Calleson,

BY

John Ewart,

ATTORNEY.

A. CALLESON.
BOTTLE FILLING AND SEALING MACHINE.
APPLICATION FILED MAR. 30, 1918.
Reissued June 10, 1919.
14,657.
14 SHEETS—SHEET 9.
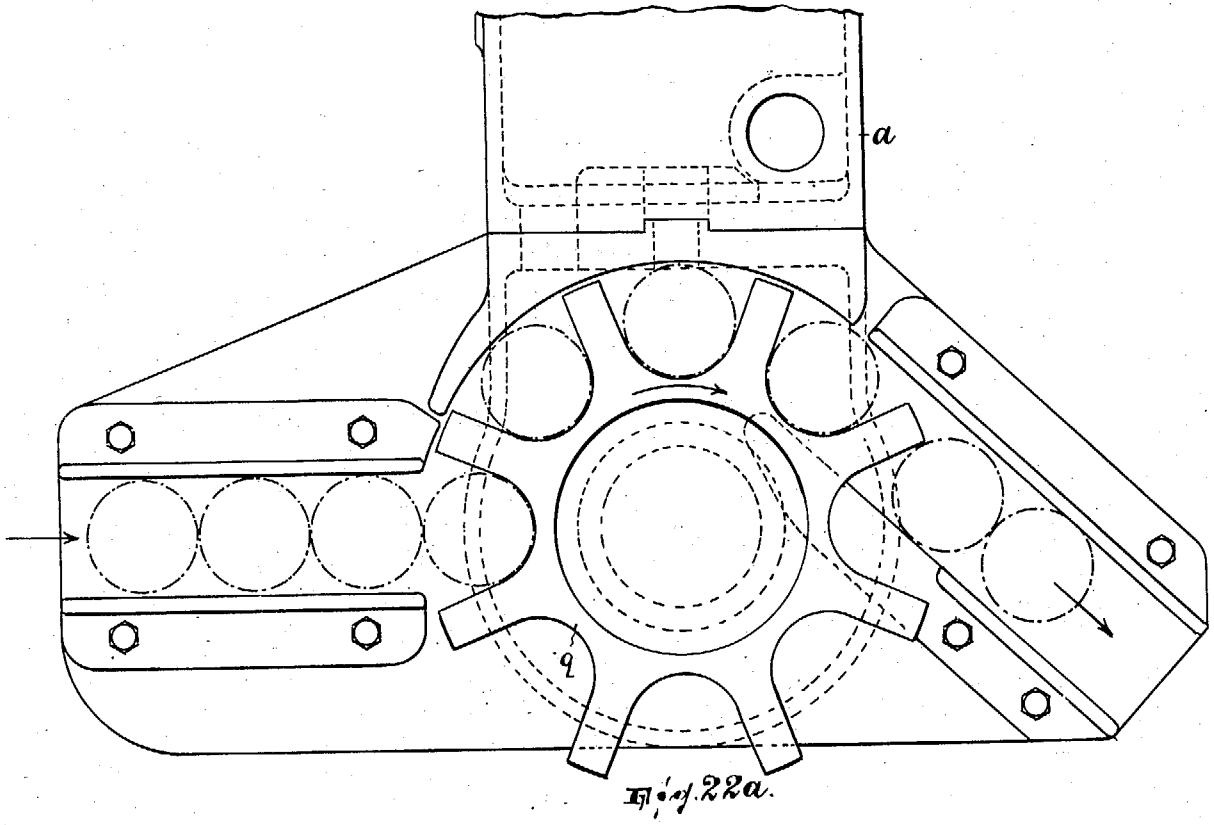
WITNESS:
Wm. Bell.
INVENTOR,
Amos Calleson,
BY
John Stewart,
ATTORNEY.

A. CALLESON.
BOTTLE FILLING AND SEALING MACHINE.
APPLICATION FILED MAR. 30, 1918.
Reissued June 10, 1919.
14,657.
14 SHEETS—SHEET 10.
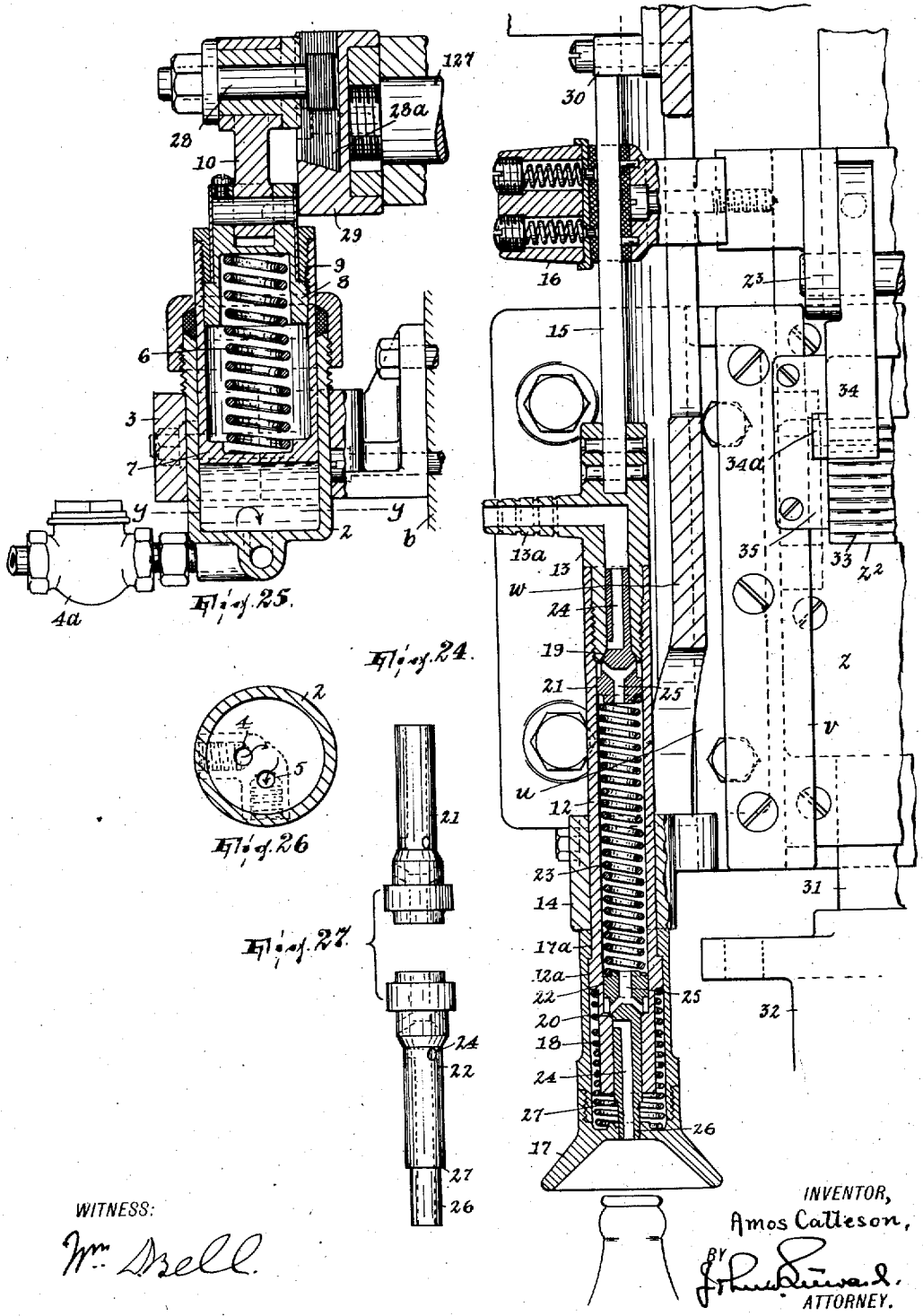
WITNESS:
Wm. Bell.
INVENTOR,
Amos Calleson,
BY
J. Thos. Stewart.
ATTORNEY.

A. CALLESON.
BOTTLE FILLING AND SEALING MACHINE.
APPLICATION FILED MAR. 30, 1918.
Reissued June 10, 1919.
14,657.
14 SHEETS—SHEET 11.
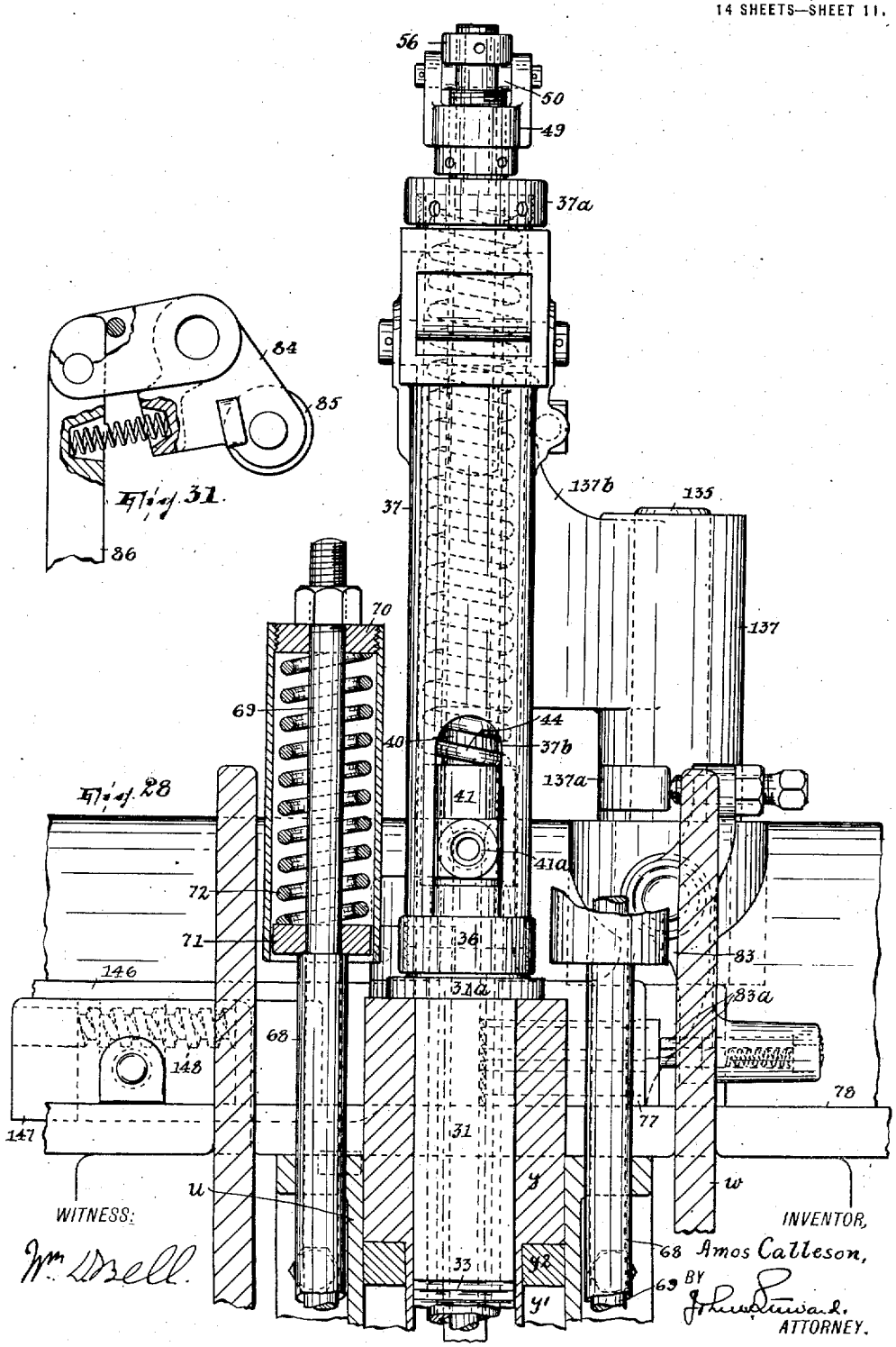

A. CALLESON.

BOTTLE FILLING AND SEALING MACHINE.

APPLICATION FILED MAR. 30, 1918.

Reissued June 10, 1919.

14,657.

14 SHEETS—SHEET 12.

WITNESS:

Wm. Dell.

INVENTOR,

Amos Calleson,

BY

John W. Stewart

ATTORNEY.

A. CALLESON.
BOTTLE FILLING AND SEALING MACHINE.
APPLICATION FILED MAR. 30, 1918.
Reissued June 10, 1919.
14,657.
14 SHEETS—SHEET 13.
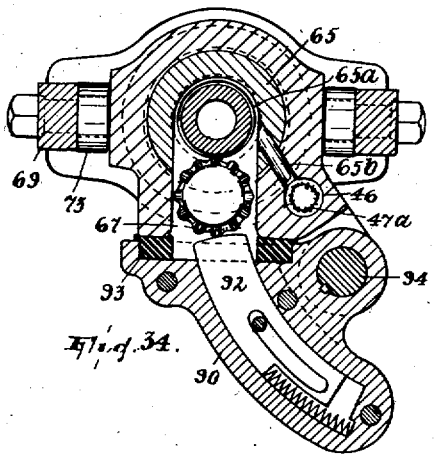
Fig. 34.
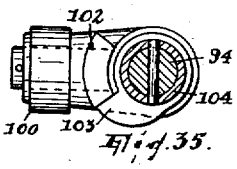
Fig. 35.
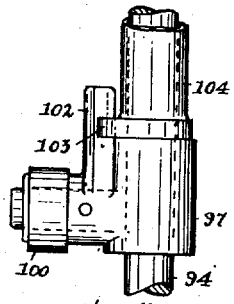
Fig. 36.
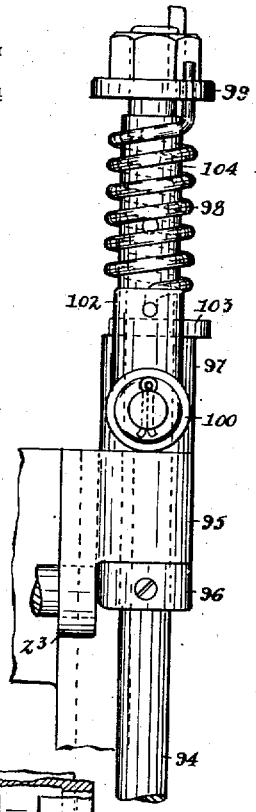
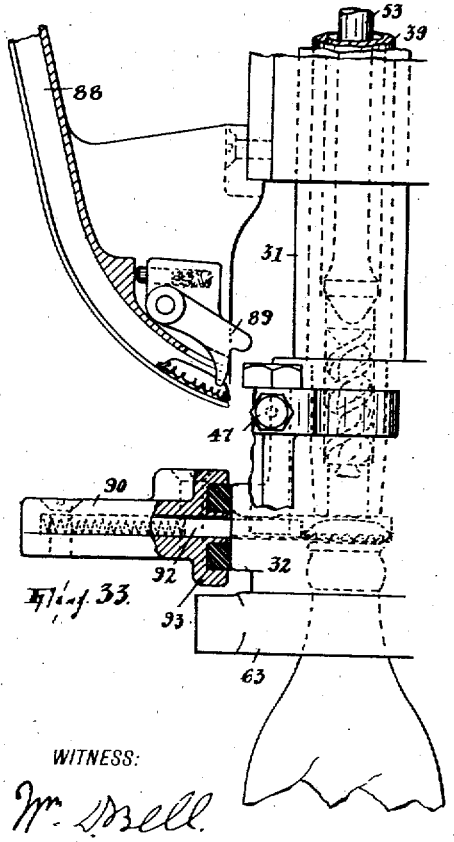
Fig. 33.
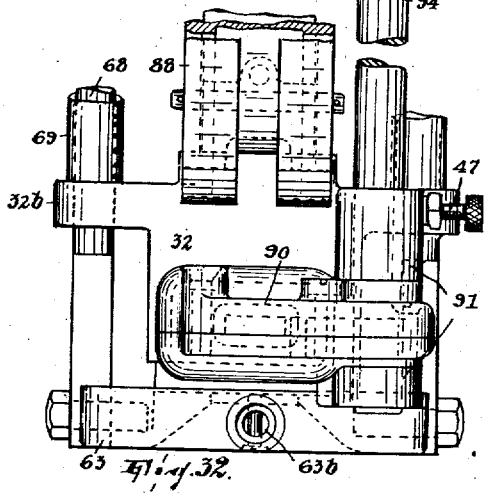
Fig. 32.
WITNESS:
Wm. Bell.
INVENTOR,
Amos Calleson,
BY
John W. Stanard,
ATTORNEY.

A. CALLESON.
BOTTLE FILLING AND SEALING MACHINE.
APPLICATION FILED MAR. 30, 1918.
Reissued June 10, 1919.
14,657.
14 SHEETS—SHEET 14.
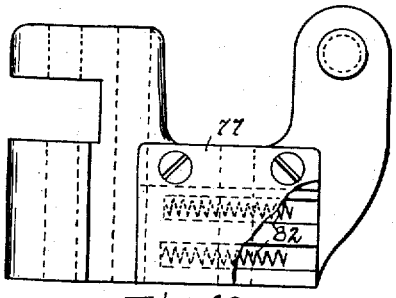
Fig. 40.
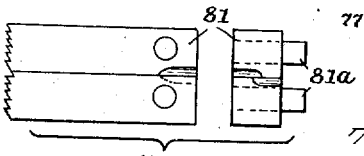
Fig. 42.
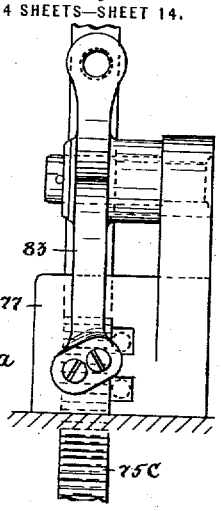
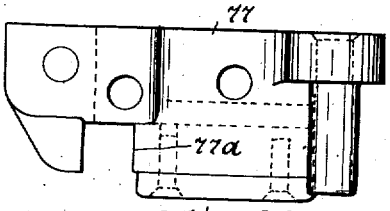
Fig. 41.
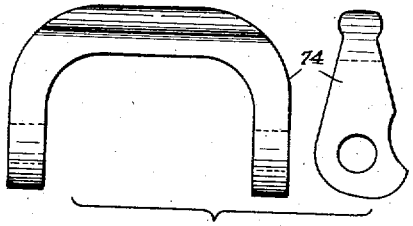
Fig. 43.
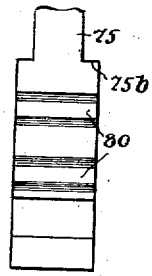
Fig. 39.
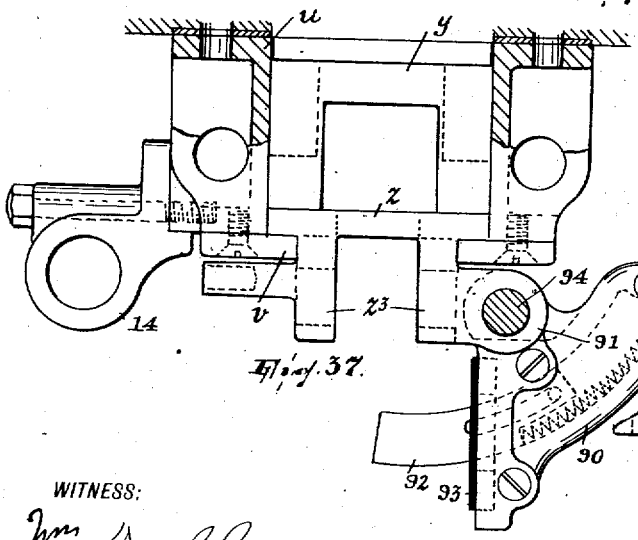
Fig. 37.
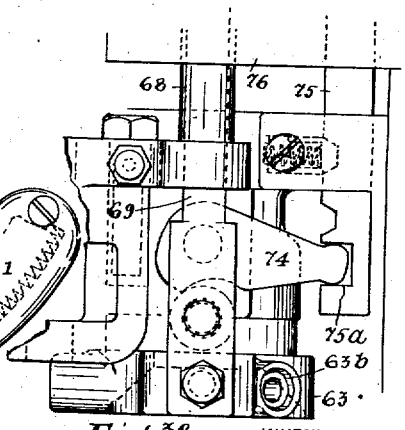
Fig. 38.
WITNESS:
Wm Bell.
INVENTOR,
Amos Calleson,
BY
John Edward,
ATTORNEY.

UNITED STATES PATENT OFFICE.

AMOS CALLESON, OF BROOKLYN, NEW YORK, ASSIGNOR TO ADRIANCE MACHINE WORKS, INC., OF BROOKLYN, NEW YORK, A CORPORATION OF NEW YORK.

BOTTLE FILLING AND SEALING MACHINE.

14,657. Specification of Reissued Letters Patent. Reissued June 10, 1919.

Original No. 1,252,881, dated January 8, 1918, Serial No. 87,805, filed March 30, 1916. Application for reissue filed March 30, 1918. Serial No. 225,818.

*To all whom it may concern:*

Be it known that I, AMOS CALLESON, a citizen of the United States, residing at Brooklyn, in the county of Kings and State of New York, have invented certain new and useful Improvements in Bottle Filling and Sealing Machines, of which the following is a specification.

The object of this invention is to provide a machine wherein bottle or other containers may be filled with liquids, and especially liquids under pressure, with greater rapidity than has heretofore been possible, with less necessity for the exercise of skill and the attention of the operator, and with uniformly good results as to the quality of the product turned out, all regardless of the capacity-standards of the containers which are to be filled and sealed and whether containers supposed to be of a certain standard in respect to size actually vary.

The invention consists in certain improvements in the means for dispensing a liquid, as a syrup, to the containers; in the means for performing other operations on the containers, as filling them with a carbonated liquid after the syrup has been delivered, supplying the closures for sealing, and sealing the containers; in the means for feeding the containers into position to be operated upon; and in the means for timing the operations on the containers so as to permit containers having different capacity-standards to be handled.

In the accompanying drawings,

Fig. 2 is a horizontal sectional view approximately on line $x$—$x$ of Fig. 13;

Fig. 3 is a view showing the lever 134 in plan and the housing $b$ in section;

Fig. 4 is a side elevation of said lever;

Figures 1, 19:
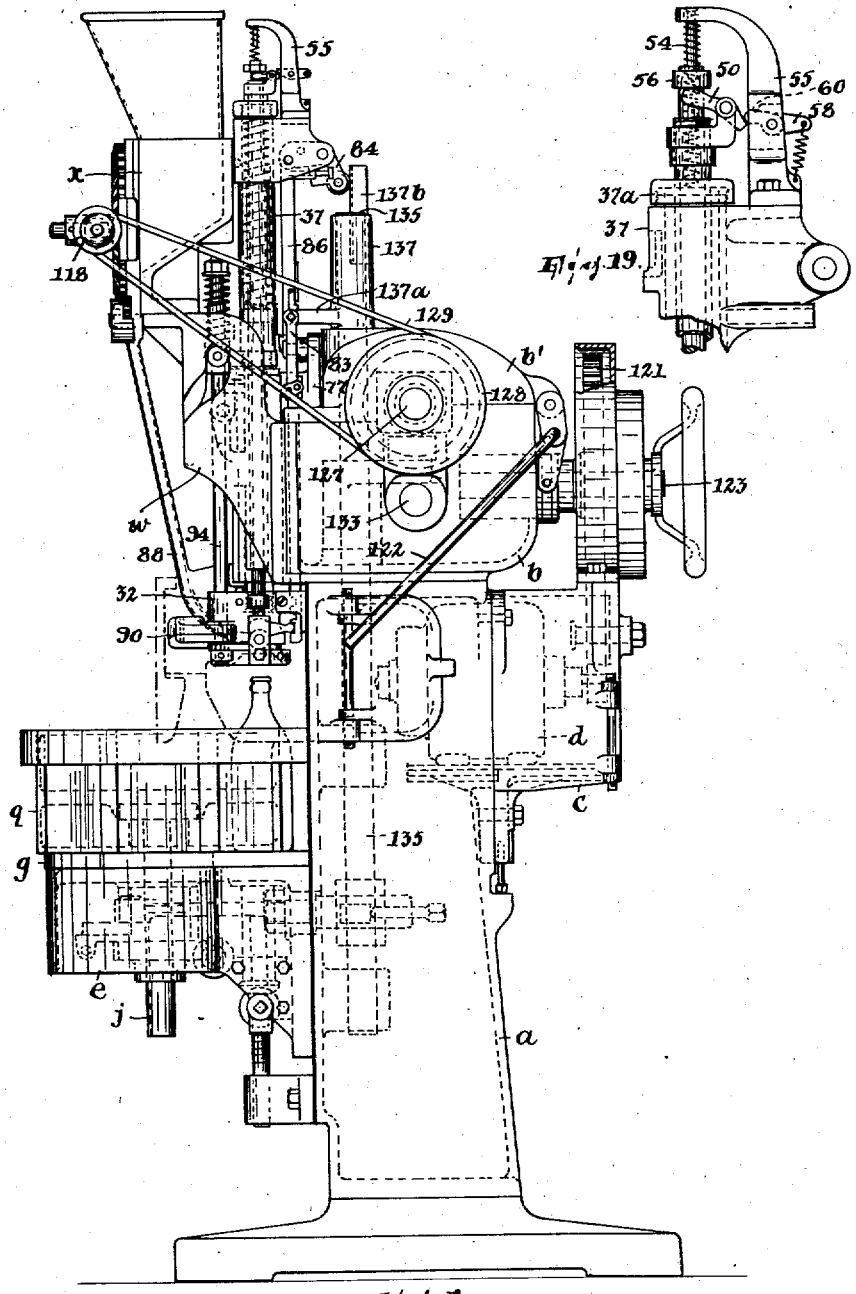
Figure 1 is a side elevation of the machine.
Figure 6:
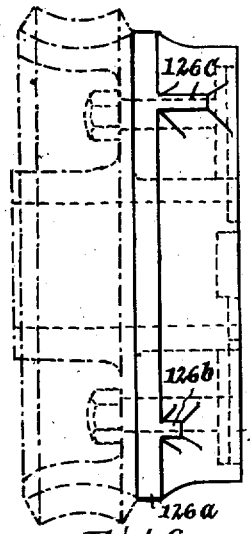
Figs. 5, 6 and 7 are a side and opposite peripheral elevations of the driving member of a certain dwell-effecting mechanism in the power train.
Figure 14:
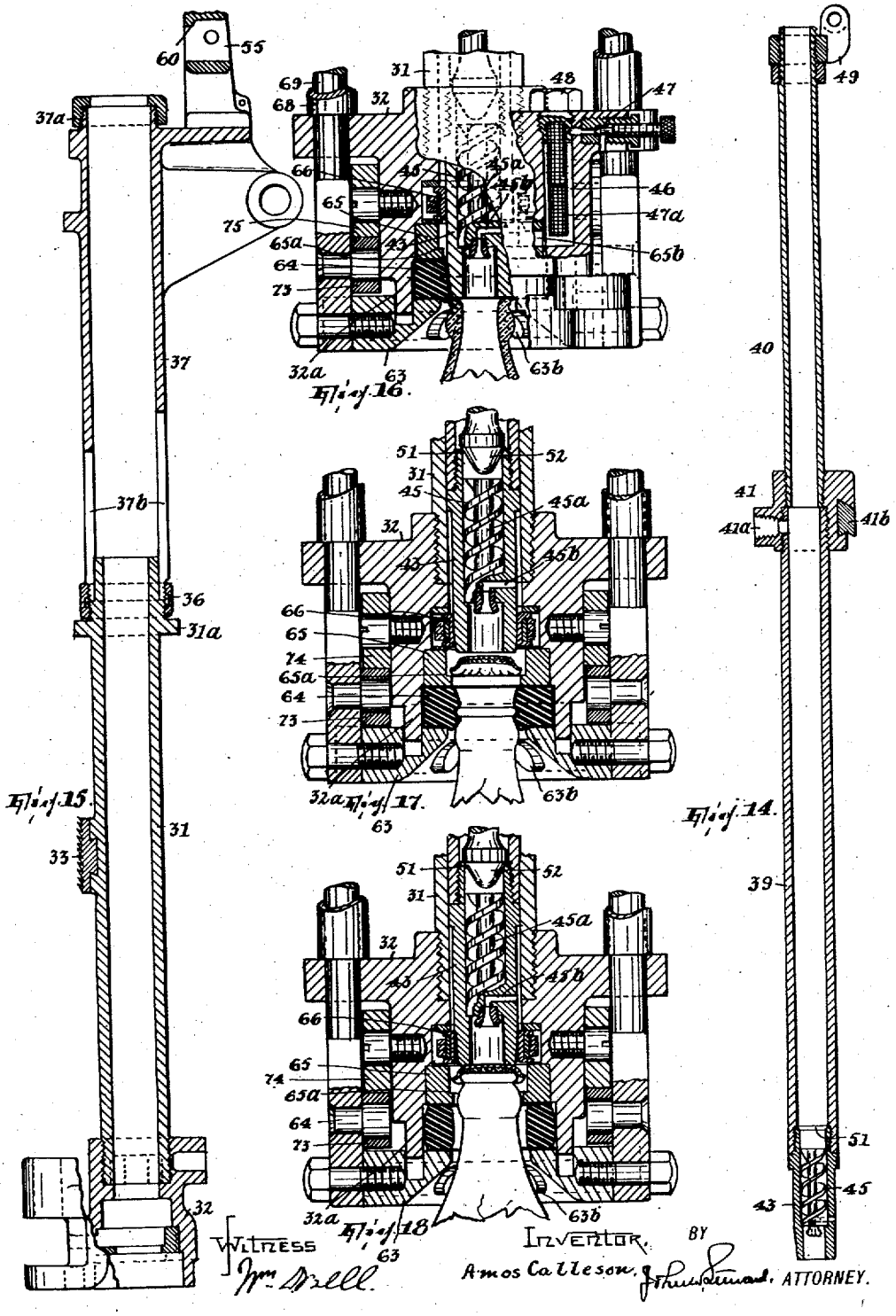
Figure 22:
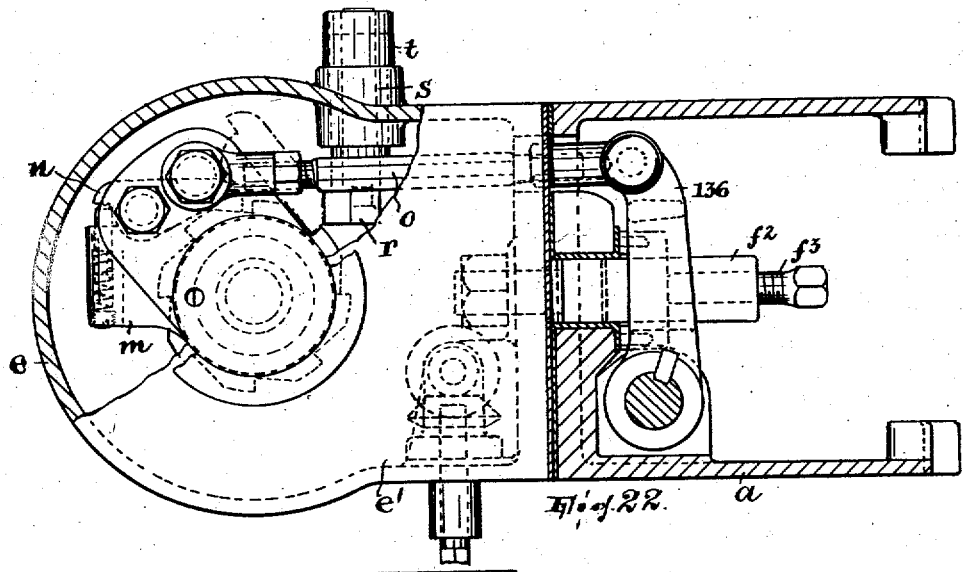
Figure 21:
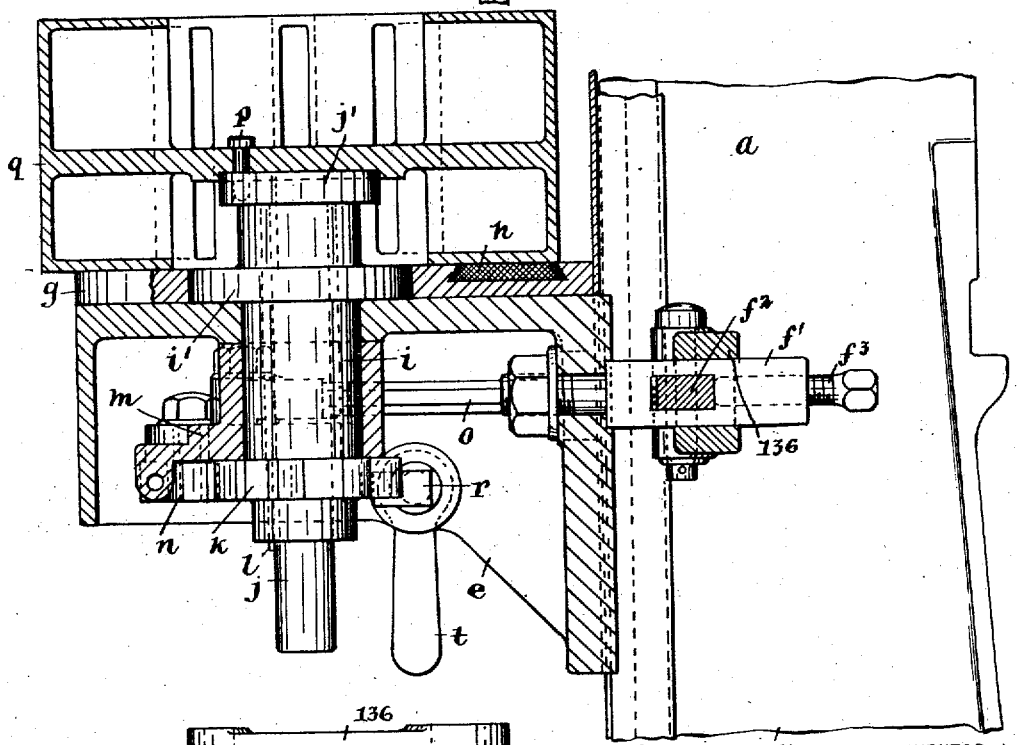
Figure 23:
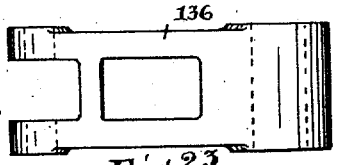
Figure 29:
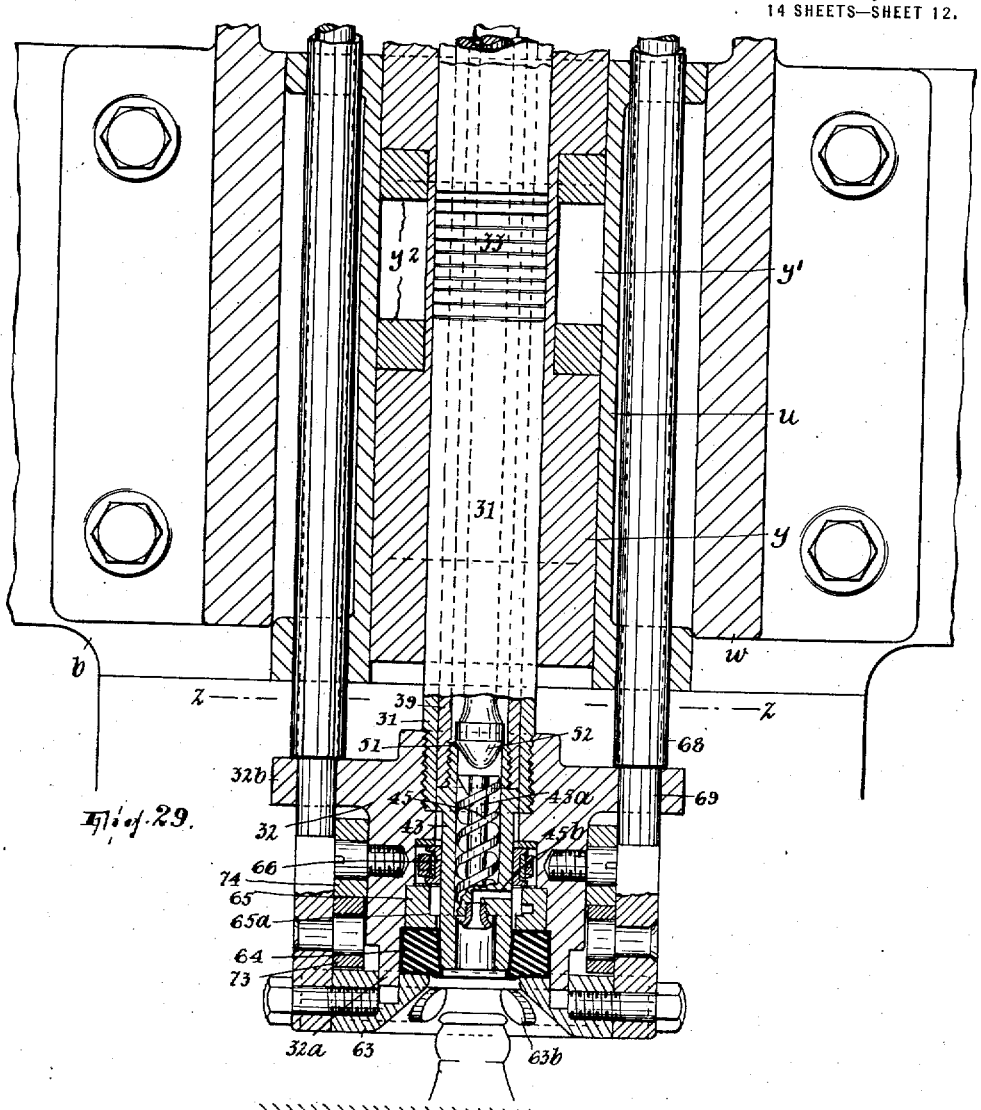
Figure 30:
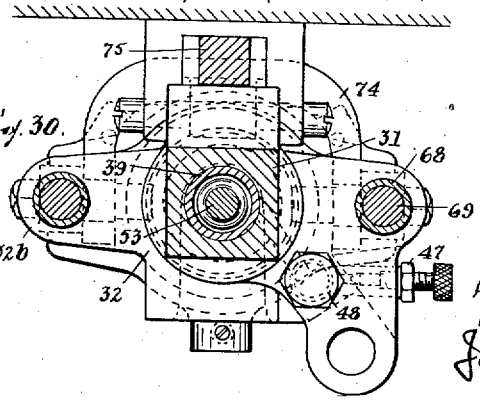

Figs. $10^a$ and $10^b$ are a side elevation and a plan, partly in section, of a modification of said mechanism, and Figs. $10^c$ and $10^d$ show details of said modification;

Fig. 11 is a front elevation of the upper part of the machine;

Fig. 12 is a detail of the cap dispensing means;

Fig. 13 is a front-to-rear vertical sectional view, in the plane of the filling and sealing means, of the upper part of the machine;

Fig. 14 is an enlarged detail view of the plunger 39—40;

Fig. 15 is a similar view of the compensating slide;

Fig. 16 is an enlarged sectional detail of the lower portion of the filling and sealing means in the position the parts thereof occupy at the time of impact with the bottle head;

Figs. 17 and 18 are similar views with the parts in Fig. 17 in the positions they occupy upon admission of the closure to its seat within the sealing head 32 and in Fig. 18 in the positions they occupy when at the inception of the closure-affixing operation;

Fig. 19 shows details of the filling valve controlling means;

Fig. 20 is a plan view of said means, partly in section;

Fig. 21 is a front to rear vertical sectional view of the lower part of the machine, showing the bottle advancing means;

Fig. 22 is a plan view of said means, with the bottle turret removed, certain parts appearing in section;

Fig. $22^a$ is a plan of a modification of the bottle advancing means;

Fig. 23 is an elevation of crank 136 shown in Figs. 21 and 22;

Fig. 24 is a vertical sectional view of the upper part of the machine, illustrating the syrup-dispensing means in particular;

Fig. 25 is a sectional view of the syrup pump;

Fig. 26 is a sectional view on line $y$—$y$ of Fig. 25;

Fig. 27 illustrates the valves of the syrup dispensing means;

Figs. 28 and 29 are enlarged views, partly in front elevation and partly in section, showing the upper and lower portions of the filling and sealing means, the slide or carrier supporting said means and the frame of the machine;

Fig. 30 is a sectional view on line $z$—$z$, Fig. 29;

Fig. 31 shows a part of the means for elevating the inner one (or plunger) of the telescoped structures of the filling and sealing means to stop the liquid flow and permit admission of the closure to be applied;

Figs. 32, 33 and 34 are a front elevation, a side elevation (partly in section) and a horizontal sectional view of the delivery portion of the closure dispensing means;

Figs. 35 and 36 show in plan and in side elevation certain parts appearing in Fig. 32.

Fig. 37 is a plan of the main slide, showing also a part of the delivery portion of the closure dispensing means;

Figs. 38 and 39 show, in side and front elevation, the lower and upper portions of a part of the means for controlling the gasket which forms a seal around the bottle neck; and, Figs. 40, 41, 42 and 43 show details of what appears in Figs. 38 and 39.

The frame of the machine includes a pedestal $a$, a housing $b$ surmounting the same and having a hinged cover $b'$, and a rearwardly projecting housing $c$ in which and the pedestal is arranged an electric motor $d$, affording in the present instance the source of power. In the machine that is shown by way of illustration the movements for effecting syrup delivery, filling and sealing are performed by an up and down movable organism suitably arranged at the front of the housing $b$ and including the syrup delivery and filling and sealing implements, the movements which the bottles receive being movement in a horizontal plane to position them one after another for first receiving syrup, then for filling and sealing, and finally for removal from the machine, the means for supporting the bottles being suitably arranged at the front of the pedestal $a$.

I shall proceed first to describe in detail the means for supporting the bottles and effecting their advance; next, the means for delivering syrup to and then filling and sealing the bottle; and finally the means for effecting properly timed movements of the moved parts contained in the first two means.

$e$ (Figs. 1, 21 and 22) is a vertically adjustable bracket secured to pedestal $a$ by a suitable fastening means, consisting of a block $f'$ bolted to the bracket, a gib $f^2$ penetrating the block and adapted to bind against the front wall (which is slotted to allow vertical movement of the block) of pedestal $a$, and a set screw $f^3$ for exerting clamping pressure on the gib. Resting upon this bracket is a plate $g$ suitably held against turning and having set into its top surface an elastic bottle seat $h$. A cylindrical bearing member $i$ is supported by its flange $i'$ on the horizontal top or plate portion $e'$ of the bracket $e$, being penetrated by a stout pin or short headed shaft $j$ which is supported by its head $j'$ resting on the top of member $i$ and which has thereon (abutting against the lower end of said member) the ratchet wheel $k$ fixed to the shaft by the key $l$. Journaled on member $i$ between the ratchet wheel and plate $e'$ is a crank $m$ carrying a spring-pressed pivoted pawl $n$ (Fig. 22) normally held against the teeth of the ratchet, $o$ being a link through which from a suitable means to be described the crank is oscillated to cause the pawl to advance the ratchet, and consequently shaft $j$, rotatively step by step. Preferably resting on the plate $g$ and secured to pin or shaft $j$ by screws $p$ so as to rotate therewith is a bottle turret $q$ radially recessed (Fig. 2) to receive the bottles. The turret-including structure is kept from moving beyond a definite point on each pick of the pawl (due to impetus received from the latter) by a stop $r$ which at the end of the pawl's throw holds the latter against the ratchet and so in the path of the tooth next back of that which it engages; said stop is the off-turned end of a bolt $s$ which by means of a handle $t$ may be turned in the bracket $e$ so that the stop clears the pawl, thus (as in the case of a turret-jam, the machine being stopped with the pawl at the end of the working thrust) to permit said structure to be turned by hand. The turret rotates clockwise, and the bottle seat $h$ is in a radius of shaft $j$ which is perpendicular to the frame of the machine so that each advance of the turret brings one bottle onto the bottle seat in position for filling and sealing and the next in position for receiving syrup, resting on the plate $g$. In the construction shown by Fig. 2 the bottles are by hand fed directly into and removed from the turret. They may be fed automatically to the turret, in which case there is preferably provided the channels or guideways shown at the right and left of the turret in Fig. 22[a].

A vertically extending longitudinally channeled casting $u$ is secured by screws $u'$ to the front face of the housing $b$ and has spaced inwardly projecting plates $v$ at the front thereof, thus forming a guide slotted at the front. (See Figs. 1, 2, 11, 13, 24, 28 and 29.) Also secured to the housing $b$ and partially inclosing this guide is a casting $w$ upon which rests the base of the closure supply hopper $x$. In the aforesaid guide is movable what I shall hereinafter term the "carrier" or "main slide" comprising a block $y$, vertically channeled at the front, and a front plate $z$ secured to the block by screws $z'$ and formed with an opening $z^2$ and above the opening with a pair of spaced ears $z^3$ (Figs. 2, 11, 13, 24, 28 and 29). The main slide is reciprocated vertically by a forked lever (134), to be described, projecting from the housing $b$, and to receive this lever it is recessed, as at $y'$, at both sides, having in the recesses the hardened bearing pieces $y^2$ (Fig. 29).

In the main slide is arranged an organization of parts comprising the compensating slide and plunger referred to in the foregoing brief description of the figures of the drawings, whose functions are to deliver the filling liquid to the bottle and then seal the latter. This latter will be described later in detail, and turning now to the syrup dispensing means:

At the extreme left of Fig. 11 (see also Figs. 2, 25 and 26) is shown a pump whose cylinder 2 is held in a clamp 3 projecting from the housing $b$ and has in the bottom thereof inlet and outlet ports 4 and 5. In this cylinder works vertically a hollow piston made in two parts having a spring 6 interposed between them, the outer part 7 having screwed into the end which receives the other part 8 a nut 9 which abuts a shoulder on the part 8 to retain it in the part 7. The part 8 is connected by a link 10 to a crank (29) hereinafter to be referred to in detail. The port 4 is connected by a check valve $4^a$ with a suitable syrup supply source and the port 5 by a flexible tube 11 (Fig. 2) with the syrup dispensing device (Fig. 24), thus described: A tubular receiver made in two parts 12 and 13 screwed together, the latter having a nipple $13^a$ to receive the flexible tube 11, is arranged to be reciprocated vertically in a projection 14 of the guide $u$, being suspended by a rod 15 received by a friction grip device 16 projecting laterally from the left hand ear $z^3$ of the main slide. Fitted over the lower end of the receiver and movable vertically thereon is a funnel-shaped mouth-piece 17 whose downward movement may be limited by contact of its shoulder $17^a$ with a shoulder $12^a$ on the part 12 of the receiver and which is cushioned upwardly by a spring 18 interposed between the mouth-piece and said shoulder $12^a$. The upper and lower ends of the passage through the receiver are restricted and form valve seats 19 and 20 which are normally closed by relatively reversed valves 21 and 22 held against their seats by a spiral spring 23 contained in the receiver, the valves being substantially alike in that each has a port 24 which extends from its relatively outer end to a point near the seating part of the valve and then is turned off, and another port 25 which extends from its relatively inner end and then divides, opening at the side of the valve short of its seating part; each valve includes a stem, as shown, (Figs. 24 and 27) having an enlargement or head (which affords the said seating part), but the stem of the lower valve has a reduced extension 26 penetrating the mouth-piece 17 and leaving a shoulder 27 which normally stands below the lower end of the receiver part 12. The main slide and the pump piston perform practically together up-and-down strokes interrupted by dwells (as will appear in the description hereinafter of the means for effecting properly timed movements of the bottle advancing means and the means for dispensing the syrup and filling and sealing). On the upstroke of the piston syrup is drawn into the pump cylinder. On the down-stroke if no bottle is present there will be no delivery of syrup because valve 22 remains closed, and the trapped syrup in the receiver and pump is subjected to pressure by the piston, whose part 7 yields. If a bottle is present, the descent of the mouth-piece is stopped thereby, allowing the lower end of valve 22 to enter the bottle (to serve as a delivery nozzle) until its shoulder 27 impinges the mouth-piece, whereupon said valve also stops and becomes unseated at 20, and, it being assumed that spring 6 is by this time under some compression, allows the syrup to be forced by the pump into the bottle; the principal function of valve 21 is to check any back-flow from the receiver to the pump on the latter's upstroke. The bottle receives only such a quantity of syrup as has been predetermined—by adjusting crank-pin 28 radially of and in a slot $28^a$ of crank 29 and consequently the length of the stroke of the pump—and when that quantity has been delivered no more will flow on account of atmospheric pressure, although valve 22 may remain held open by the bottle due to the main slide being at dwell. In theory, the syrup delivery for all bottles of the same height standard should begin at the same elevation (bracket $e$ being adjusted vertically to that end); but on account of bottles of the same height standard varying this is impossible in actual practice, wherefore the dispenser is arranged to descend to a level low enough to accomplish delivery for the shortest possible bottle of any height-standard and bottle of greater heights are taken care of by the slip-grip of the device 16 on rod 15 (which latter is reset downwardly in the device 16 on contact during each upstroke with the stop 30 on casting $w$). Of course the opening of the valve for a short bottle comes later in the downstroke of the piston 7—8 than for a high bottle; but the piston member 8 yields to the entrapped liquid in such cases until its escape begins.

Referring, now, to the aforesaid organization of parts carried by the main slide: 31 is a slide (termed herein the "compensation slide") penetrating the main slide and normally supported by its flange $31^a$ resting on the top of the main slide and carrying at its lower end the sealing and filling head 32 (to be described later in detail), screwed thereon. It has a toothed surface 33 registering with the opening $z^2$ in the main slide and adapted to be engaged by the spring-pressed pawls 34 pivoted in the ears $z^3$ of said main slide when lugs $34^a$ (Fig. 24) on said pawls, in the descent of the main slide, run off the elevations 35 of the plates $v$. For compensating for varying heights in bottles assumed to be of standard height the compensating slide, when in its downward movement with the main slide the bottle is encountered, stops until the pawls 34 clear elevations 35 and thus engaging the toothed surface 33 force the compensating slide to continue downward with the main slide, this operation being somewhat the same as in my patent No. 913,182. Telescoped over the upper end of the compensating slide and secured thereon by the nut 36 is a tubular upright extension 37 which has a roller-bearing support 38 against the back of the (fixed) hopper $x$ and a cap $37^a$ screwed on its upper end, its lower end being provided with front and rear vertical slots $37^b$.

In the compensating slide and projecting up through extension 37 and cap $37^a$ is a hollow plunger comprising lower and upper tubes 39 and 40 connected by the union 41 which has a nipple $41^a$ and a hardened shoulder $41^b$ projecting through the front and rear slots $37^b$, respectively, and also comprising the tubular extension 43 screwed into the tube 39. A spiral spring 44, housed in extension 37, is interposed between union 41 and cap $37^a$, normally holding down the plunger to a limit afforded by contact of the union with the upper end of the slide 31. The extension 43 has a screw 45 therein whose axial portion $45^a$ (coaxial with said extension) has an angular port $45^b$ entering its lower end and discharging laterally into a chamber 46 (Fig. 16) having a screw-adjusted outlet 47 and containing a downwardly elongated hollow gauze or the like finely foraminous foam-retarding capsule $47^a$ controlling said outlet and held removably in the head 32 by its supporting screw 48, which includes a part of the outlet 47. A nut 49 screwed on the upper end of tube 40 affords a fulcrum for the lever 50.

Plunger extension 43 affords a valve seat 51 at its upper end. This valve seat is normally closed by the valve 52 at the lower end of a long spindle 53 which penetrates the plunger 39—40 and is held depressed by a spring 54 set into the upper end of the spindle and held under compression by an arm 55 that projects upwardly from a rigid part of the extension 37 of the compensating slide. On the upper end of the spindle is screwed a collar 56 by means of which, when the plunger 39—40 is stopped in the downward movement of the main and compensating slides by contact with the bottle head, lever 50 acts to produce differential movement of the spindle relatively to the plunger, raising the spindle and hence valve 52 from its seat, said lever being tilted as a dog 58 (pivoted in and bearing upwardly against the arm 55) in moving downward with the compensating slide presses downwardly on the free or outer end of said lever; as will appear later, after the dog has thus assumed the position shown in Fig. 19 with reference to the lever, further downward movement of the compensating slide brings the dog below the lever, and when the parts resume their normal positions (Fig. 13) the dog, which is normally held by a spring 59 against the arm 55 at 60 as a stop, is wiped aside by the lever. At 61 in Figs. 11 and 13 is shown a flexible tube connecting nipple $41^a$ with a valved pipe 62 leading from a source of supply (not shown) of carbonated or other filling liquid.

The sealing and filling head 32 has a downwardly projecting lip $32^a$ entering an annular groove in the mouth piece 63, which has slight vertical movement with respect to the head 32 and supports an elastic sealing gasket 64, a ring 65 resting on the gasket and having an internal closure supporting ledge $65^a$ and an annular closure affixing appliance 66 resting on the ring 65, the parts 64, 65 and 66 being housed in the head 32 and penetrated by the tubular plunger extension 43 (Figs. 13, 16–18 and 29) and the parts 65 and 66 affording a throat, *i. e.*, a passage, in which the sealing operation takes place. The head 32 has at the front (Figs. 11 and 13) a closure inlet 67, which also penetrates the ring 65; ring 65 further has a port $65^b$ (Fig. 16) affording communication between port $45^b$ and chamber 46. To cushion the impact of the mouth piece 63 with the bottle head said mouth piece may have radially movable inwardly spring pressed beveled guides $63^b$ (Fig. 13).

When the main slide descends and brings the extension of the tubular plunger 39—40 against the bottle head, a sealed connection between the bottle and filling and sealing head 32 is formed, thus: Two ears $32^b$ (Figs. 29 and 30) on the head 32 support tubes 68 penetrating and movable vertically in the casting $u$. Through these extend the rods 69 which are coupled to the mouth-piece 63 and are equipped at their upper ends with suitable abutments 70 (Fig. 28) between which and abutments 71 superimposed upon the tube 68 are coiled the springs 72 (Figs. 28 and 29); these springs normally hold the mouth piece elevated, so that between it and the ring 65 the gasket 64 is compressed and its lower inner edge contracted to a diameter (Figs. 16 and 29) somewhat less than the lip at the bottle mouth. Ultimately, the gasket is relieved from compression, and this is effected by the following means: The rods 69 are equipped with rollers 73 and adapted to bear thereon is a forked lever 74 (Fig. 43) fulcrumed on the head 32. The free end of this lever is engaged in a notch 75[a] of a vertical rod 75 slidable vertically in bearings 76 at the front of the housing *b* and the groove 77[a] of a block 77 which is bolted upon a platform 78 on said housing; the head has a slip-grip on said rod, afforded by a spring-dog 79 having a tapered end engaging in one of two tapered notches 80 in the rod and the rod may move upward to a limit afforded by contact of its shoulders 75[b] (Fig. 39) with the lower bearing 76. During a part of the descent of the head 32 the rod 75 slides down with it, but when the release of the gasket is to occur the descent of the rod is checked and the head continuing downward lever 74 is turned on its fulcrum therein and cams down the mouth-piece 63 against the tension of springs 73, while the dog 79 slides from the upper to the lower notch 80. The descent of the rod is checked by the toothed blocks or dogs 81 sliding in the block 77 and normally held retracted by springs 82 housed in block 77 and engaging studs 81[a] on the dogs but adapted to be pressed into positive-locking engagement with a toothed surface 75[c] on said rod by a lever 83 fulcrumed in block 77 and having spring-pressed pins 83[a] to engage said dogs when said lever is moved as hereinafter stated (Figs. 1, 2, 28 and 39–42). The teeth of the rod and dogs are ratchet teeth preventing downward but not upward wiping of the rod on the dogs.

When the main slide descends, the plunger 39—40 on impact with the bottle head, together with the compensating slide supported on the plunger through the medium of its extension 37 and spring 44, will stop until, compensation being attained, pawls 34 lock the compensation slide to the main slide and cause the former again to descend, which (as will appear) involves a comparatively small movement, followed by the dwell which has been hereinbefore alluded to; such movement, since the plunger is prevented by the bottle from partaking thereof (spring 44 being somewhat compressed) involves raising of valve spindle 53, and the consequent opening of valve 52 for the flow of the filling liquid to the bottle, caused by dog 58 tilting lever 50 as it descends to the position shown in Fig. 19. Filling being accomplished, the valve must be closed and plunger 39—40 raised enough to elevate plunger extension 43 above closure inlet 67 to admit the closure to the ledge 65[a] of ring 65. To accomplish these functions there is provided the following mechanism: A bell-crank lever 84 is fulcrumed in a fixed part of the extension 37 of the compensation slide and has on one arm a roller 85 and pivoted to the other a depending hook 86 whose lower (hooked) end is normally pressed against union 41 of the plunger 39—40 by the spring 87 (Figs. 13, 20 and 31); the hook has a depending shoe 86[a] at the back with which rod 75 coacts as will appear. When, upon compensating having been effected, the compensating slide makes the slight downward movement mentioned relatively to the plunger 39—40, hook 86 is caused by its spring to latch under shoulder 41[b] on the plunger; then, toward the end of the dwell heretofore mentioned, by means to be described pressure is effected on roller 85, whereby lever 84, in tilting, through the medium of the hook raises the plunger, lever 50 being caused to clear dog 58, allowing valve 52 to close and the plunger being carried up until its extension 43 is above the closure inlet 67.

The closure-supply chute 88 is stationary and has at its discharge end a spring-pressed retaining pawl 89 which supports the whole line of closures in the chute except when it is uplifted by the head 32 as the same comes to its highest elevation, allowing a closure to enter the inlet and rest therein against the plunger extension 43. When the main slide and the other parts carried thereby descend and come to a dwell and then the plunger is lifted to clear the closure inlet the waiting closure is forced onto the closure-seat 65[a] thus: An arc-shaped sealing gate 90 is fulcrumed in the sealing head 32 between two ears 91 thereon so as to move in a horizontal plane, and it houses a spring pressed tongue or pusher 92 adapted to register with and enter the closure inlet 67 when the gate is swung against the front face of the head; to seal the closure inlet when the gate is closed the latter is provided with a rubber gasket 93. The fulcrum for the gate is a shaft 94 journaled in ears 91 and a bearing 95 on the right-hand ear *z*[3] of the main slide, the shaft being splined to the gate so as to allow relative movement vertically and caused to reciprocate with the main slide by the collar 96 and a crank-sleeve 97 thereon abutting oppositely against the bearing 95, the former being pinned to the shaft and the latter yieldingly held against turning relatively thereto by the torsion spring 98 fastened at one end to the crank-sleeve and at the other to a suitable head-piece 99 keyed on the shaft. The arm or crank portion of the crank-sleeve is equipped with a roller 100 engaged in a cam-slot 101 in the housing *w*, and it has an upstanding projection 102 which normally abuts against a lug 103 on a sleeve 104 pinned to the shaft (see Figs. 1, 2, 11 and 32–36). When the main slide is up, the gate is open (Figs. 11 and 37), the closure inlet 67 being then opposed by the lower end of the chute 88; when it has descended to the position for dwell roller 100 is at the upper end of the straight part of the cam slot forming its lower end. In the latter position the gate is held by the torsional pressure of spring 98 in sealing relation to the side of head 32; its pusher 92 is held retracted or sheathed in the gate by the waiting closure housed in the mouth of the closure inlet and bearing laterally against the plunger extension 43. When at the end of the dwell, the plunger extension is elevated, the closure is thrust to its seat on the ledge 65[a] by the spring-pressed pusher. When, after further downward movement succeeding the dwell, the main slide rises, the cam-slot causes the gate to be thrown open, clear of the lower end of the chute 88. Spring 98 eases the action of the cam-slot to close the gate, as well as exerts a yielding pressure on the gate when closed, while the positive engagement of projection 102 against lug 103 occurring when the roller 100 travels up the cam-slot causes the opening movement of the gate to be quick where it might be so sluggish as to involve interference of the gate with the chute if the turning movement were imparted to the shaft through the spring.

The closure supply hopper *x* (Figs. 11 and 13) has its bottom wall 105 sloping toward the front wall 106 which is a disk journaled on the stud 107 and having beveled and peripheral gear teeth; on the back of this disk is a concentric groove 108 formed gradually deeper toward its outer edge. There is a space 109 somewhat greater than the thickness of a closure between the marginal portion of the disk and the front surface 110 of the hopper, which surface is flanked by a flange 111 that extends concentric with the disk and close enough thereto to retain the closures in said space except at the bottom, where an opening 112 (Fig. 11) is left to admit the closures to the chute; surface 110 is plane excepting for a rounded rib 113 registering with groove 108. The disk has two sets of apertures 114 in alternating radii, one set being in a circle of less diameter than and the other registering with the groove. Secured by suitable means to the outer face of the disk are yielding agitators 115 (in the form of rebent lengths of wire) which project through the apertures. An incased suitably journaled rotary agitator 116 (herein taking the form of a toothed wheel meshing with the peripheral teeth of disk 106) is arranged with its periphery projecting slightly into the chute and also into the space 109. Through the medium of a shaft 117 journaled in the hopper and equipped with a driving pulley 118 and with a bevel pinion 119 meshing with the beveled teeth of the disk, the latter and agitator 116 are rotated in the direction of the arrows seen in Fig. 11. A mass of closures placed indiscriminately in the hopper will be tumbled by the relatively inner set of agitators 115, thus promoting their being faced properly so that they will pass the coacting rib 113 and groove 108 (see my Patent No. 1042,068); any that would otherwise remain caught in the groove are dislodged by the relatively outer set of agitators; and, finally, any that might tend to clog the outlet (entrance to the chute) are disturbed by the agitator 116, which further prevents congestion at the outlet, due to the chute filling up with closures, by directing the surplus to the right and so on back into the mass in the hopper.

The power for driving the machine is in the present instance obtained from the electric motor *d*. Through suitable gearing 121 and a clutch (not shown) controlled by the lever 122 the power is transmitted from the motor to the shaft 123 (Figs. 2 and 13) equipped with a worm 124 meshing with the worm portion 125 of a rotary member including a clutch 126 freely revoluble on a transverse shaft 127. Shafts 123 and 127 are journaled in the housing *b*. At one end shaft 127 has affixed thereto the crank 29 for operating the syrup pump, and at the other end a pulley 128 around which and the pulley 118 for driving the disk 106 of the closure supply means an endless belt 129 (Fig. 1) extends. Fixed on the shaft 127 are the following elements: a clutch member 130, spaced peripheral cams 131 and a barrel cam 132. On a shaft 133 mounted in the housing below and parallel with shaft 127 is fulcrumed a two-armed lever 134 which is oscillated by the coaction of the two cams 131, having rollers 134[a] bearing thereon and a fork 134[b] (Figs. 3 and 4) engaged in the main slide at *y'*. In suitable bearings in the pedestal *a* and housing *b* is journaled a vertical shaft 135 carrying a crank 136 to which the link *o* is attached (Fig. 22) and a crank 137 (Figs. 1 and 28) having a horizontal arm 137[a] for actuating the lever 83 and a vertically elongated arm 137[b] for actuating the lever 84, and also carrying a crank 138 equipped with a roller 138[a] (Fig. 2) engaged in the groove of the barrel cam 132.

Figure 5:
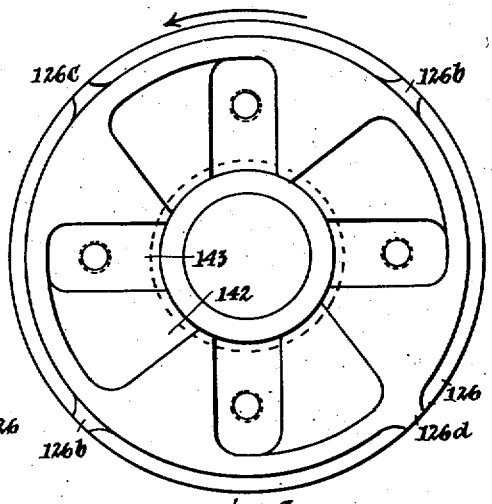
Figure 7:
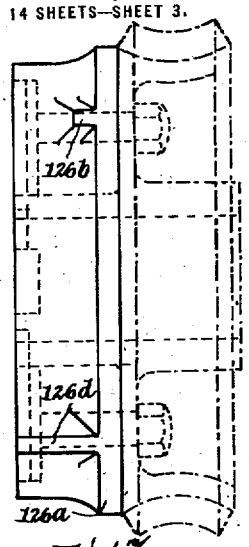
Figure 8:
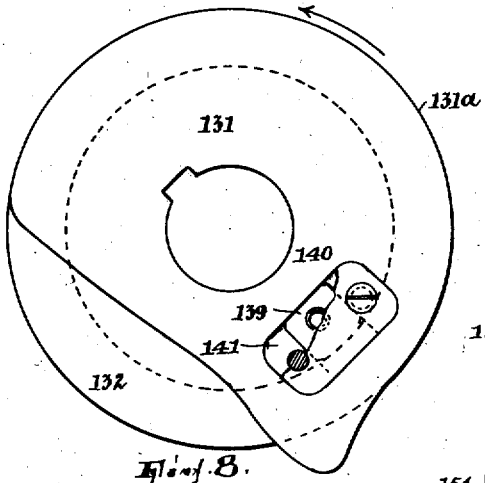
Figs. 8 and 9 are side elevations of cams included in the driven member of such mechanism.
Figure 9:
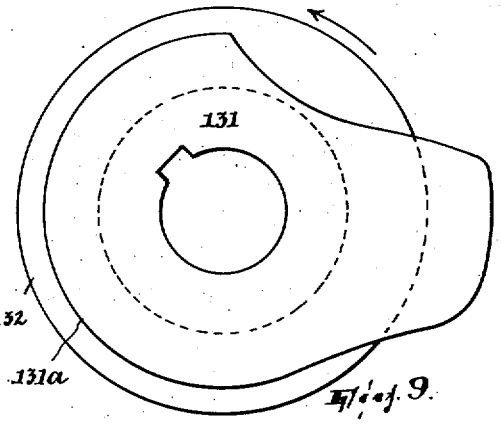

Assuming the shaft 127 to be rotated at constant speed, the relation of the cam 132 to the cams 131 is such that when the latter elevate the main slide the former causes the turret to advance one step to position one bottle under the syrup dispenser and another, already supplied with syrup, under the sealing head 32. The cams 131 are formed with opposite neutral or concentric portions 131[a] (Figs. 8 and 9) which, as will be explained in the detail operation of the machine, cause a dwell in the descent of the main slide that is sufficient to permit the filling (through the head 32) of bottles having the smallest capacity-standard. For filling bottles of greater capacity-standard the said dwell in the present machine is increased by bringing to a standstill the shaft 127 to which the cams 131 (and the other elements on said shaft which actuate the moving parts of the machine are fixed. This is accomplished, in a way to permit the dwell to be of variable extent, as follows: Clutch member 130 (which in the present instance is formed integral with the left-hand cam 131, Fig. 2) contains a latch 139 movable parallel with shaft 127 and normally pressed by a spring 140 contained in the housing 141 (Fig. 8) for the latch toward and into engagement with the adjoining face of clutch member 126, which has segmental pockets that are somewhat shallower at 142 than they are at 143 (Fig. 5). According as a latch retractor in the form of a knife 144 pivoted at 145 on a horizontal axis parallel with the shaft 127 (Figs. 2 and 13) is shifted into or out of the path of a beveled face 139[a] on the latch, so, assuming the latch to be locking the clutch members 126 and 130 together, it will withdraw the latch when it sweeps around (thus unlocking the clutch members), or leave it undisturbed. On the platform 78 and suitably retained in place by a cover plate 146 (Figs. 2 and 11) is arranged to slide parallel with the shaft 127 a block 147; its sliding movement may be effected by the manually operated screw 148 swiveled in the housing and having its threading engaged with the block. It carries a dog 149 spring-pressed against the periphery of the clutch-member 126 and having freely penetrating it a laterally projecting pin 150 on the retractor 144. At its left side the periphery of the clutch member 126 is continuous or circular, as at 126[a]; but the remainder of its periphery, somewhat reduced in diameter, has in the present case two diametrically opposite projections 126[b] extending each one-third of the distance toward the right side of the clutch member and two other diametrically opposite projections 126[c] and 126[d] (each 90° from each projection 126[b]), the former of which extends two-thirds of said distance and the latter clear to the right hand side of said member. When the dog is arranged so as to bear on surface 126[a] the knife will be held back, and clutch member 130, being therefore locked to clutch member 126 will, as also shaft 127 and all the mechanisms driven therefrom, be driven thereby, the dwell which occurs in this case being only that produced by the cam surfaces 131[a]. On shifting the dog the next stage to the right the dwell due to cam surfaces 131[a] will be augmented by a dwell due to actual stopping of the clutch member 130 and consequently shaft 127 and all parts operated from it, thus: The retraction of the latch is caused by its sweeping around against the knife when the latter is in the retracting position; and always, though the knife, immediately be returned to that position after withdrawal to release the latch (to allow it to lock clutch member 130 to clutch member 126), the locked members must make one complete revolution before retraction can be again effected by the knife. In the position of lateral adjustment of the dog now assumed, the clutch member 130 for each revolution of clutch member 126 will complete a cycle and come to a dwell, the knife being in latch-retracting position because at the end of the revolution the dog is not on a projection but on a low portion of the periphery of clutch members 126; in this the dog will have been repressed (withdrawing the knife) four times by the four projections (but, each time without effect on the latch, of course, because it is out of position to engage the knife). But on the repression of the dog next ensuing after inception of the dwell and consequent release of the latch the latter will enter that pocket 142—143 of clutch member 126 which happens to be opposite, locking the clutch members together for another complete cycle. The pockets are equally spaced and four in number, so that after four idle impulses have been imparted to the knife by the projections and then, the latch being unlocked, the fifth impulse occurs and the latch consequently resumes locking position a dwell of a one-quarter revolution has occurred. On shifting the dog to the next stage the operation is the same, except that since in this case only two projections 126[c] and 126[d] are operative the dwells are equal to one-half a revolution. On shifting the dog to the next stage the operation is again the same, but results in dwells equal to a full revolution. In all cases, as stated, one complete revolution of clutch member 130 (and all parts driven therefrom) intervenes between dwells due to retraction of the latch. Thus, the machine is adapted, by manipulating screw 148, for the filling of, for instance, bottles of the half-pint, pint and quart sizes, for example.

Figure 10:
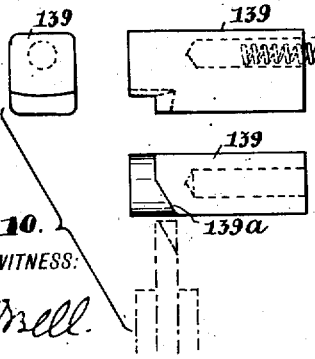
Fig. 10 shows in detail a bolt for locking said members together and its controlling knife.
Figure 10D:
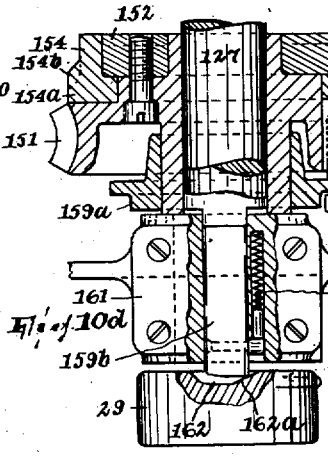
Figure 10A:
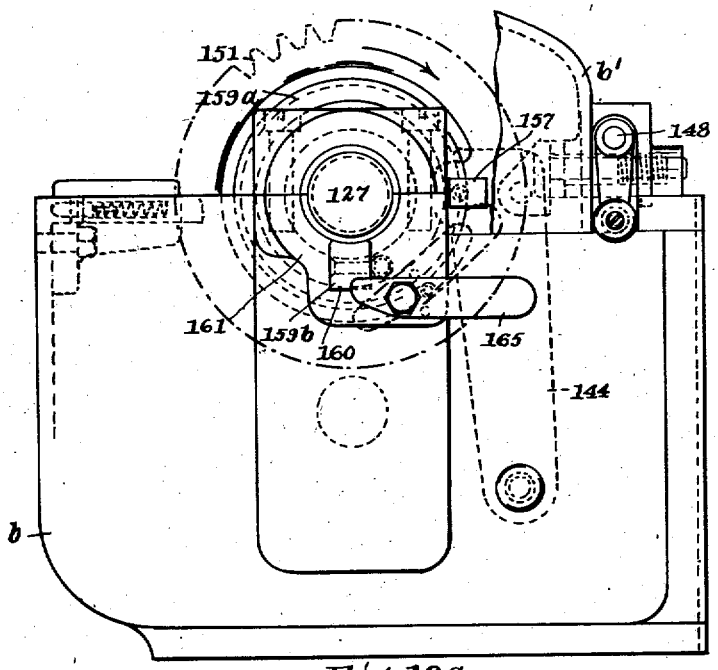
Figure 10C:
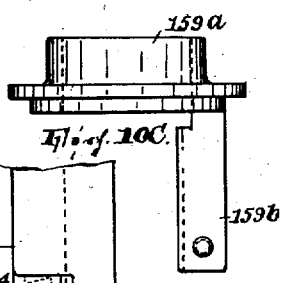
Figure 10B:
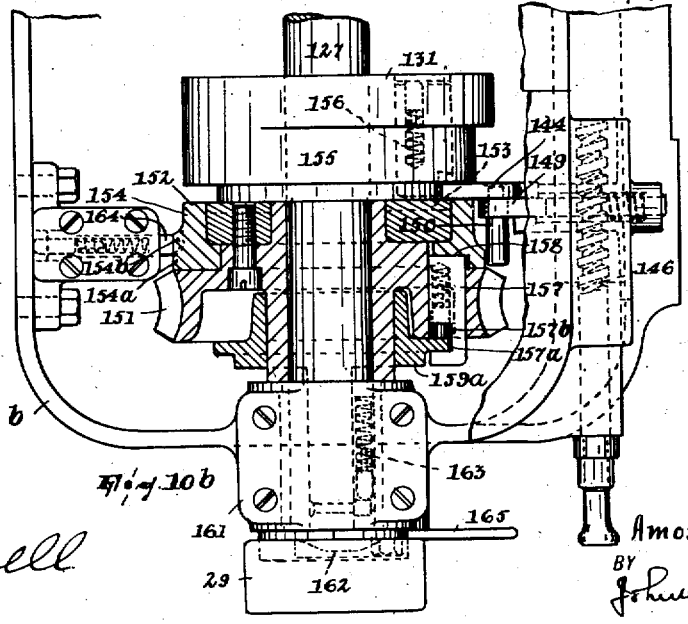

In Figs. 10[a] and 10[d] a modification of the filling-time-control mechanism is shown adapted to effect dwells not only of $\frac{1}{4}$, $\frac{1}{2}$ and 1 full revolution (for half pints, pints and quarts) but of $1\frac{1}{4}$, $1\frac{1}{2}$ and 2 full revolutions (for one and one quarter, one and one-half and two quart bottles). Here the worm-wheel 151 has secured thereon by screws a clutch 152 having pockets 153 like the pockets of clutch 126 already described; part 152 retains in place a ring 154 revoluble thereon. 151, 152 and 154 correspond to the member including the worm-wheel 125 and clutch 126 already described, being likewise revoluble on shaft 132; but in this case, as described above, the peripheral part (154), which has the peripheral continuous surface 154[a] and projections 154[b] like those of clutch member 131, is revoluble independently of the rest. The other clutch member, 155, is identical to clutch member 130, being fast on the shaft and carrying the spring-pressed latch 156, corresponding in every respect to latch 139.

Movable in member 151—152 parallel with shaft 127 is a latch 157 having its right-hand end engageable in a single pocket 158 in the adjoining face of ring 154 and its left-hand end projecting and formed with an inwardly facing notch 157[a] whose inner side is formed by a spring-cushioned pin 157[b]. This notch receives the continuous exterior flange of the annular portion 159[a] embracing the shaft, of a latch-controller including the thrust-piece 159[b] extending parallel with said shaft and slidable in a hole 160 penetrating the bearing 161 for the shaft and adapted to enter a recess or notch 162 in the inner face of the hub-portion of crank 29 (when said notch turns into coincidence therewith) under the pressure of a spring 163 housed in said bearing. Measured in degrees of a circle, recess 162 is approximately the same distance from latch 157 as knife 144 is from the thrust piece 159[b] of the controller. Viewed from the left, shaft 127 rotates clockwise, and the right side of notch 162 is sloping, forming a cam, as at 162[a], Fig. 10[d].

It will be apparent that if the ring 154 remains locked (by latch 157) to member 151—152, these parts then rotating as one, the operation would be the same as in the filling-time-control mechanism already described, *i. e.*, there would be no augmented dwell, or a dwell of $\frac{1}{4}$, $\frac{1}{2}$, or one full revolution, alternating with one full rotation of shaft 132, according as the dog 149 occupied the first, second, third or fourth positions, respectively, from the left with respect to the periphery of ring 154.

Assuming that dwells of $1\frac{1}{4}$ revolution are to be produced (dog 149 being arranged to be struck by all four projections on ring 154, and starting at the beginning of a dwell): Recess 162 comes opposite the latch-controller thrust-piece 159[b], which retracts the latch 157 to break the connection between the constantly rotating member 151—152 and ring 154, the latter being however immediately cammed back by surface 162[a] of the recess so that the latch (wiping over the face of the ring) will snap into the pocket 158 when member 151—152 has completed a revolution. (Latch 156, moreover, also was withdrawn when latch 157 was withdrawn, because knife 144 is the same number of degrees of a circle from part 159[b] of the controller as latch 156 is from recess 162). Having thus completed one idle revolution member 151—152 "picks up" the ring 154, by its latch snapping into pocket 158, and turns it. This turning causes one of the projections on the ring to force back the knife so that, in the regular way, after a quarter idle revolution, the latch 156 by entering the adjacent pocket in member 155 "picks up" the latter and shaft 132 and causes them (they having now been standing at dwell while member 151—152 rotated $1\frac{1}{4}$ revolutions) to rotate until the latch 156 and recess 162 again come around to the knife and controller, *i. e.*, after performing one complete revolution. Thereupon the operation will be repeated, giving alternate dwells and rotations of the shaft respectively equal to $1\frac{1}{4}$ and one full revolution of the driver—151—152. The operation will be substantially the same if dog 149 is arranged to be struck by only two or only one of the projections on the ring, excepting that in those cases the idle movement for one revolution of member 151—152 with respect to the ring will give dwells of $1\frac{1}{2}$ and 2 revolutions, respectively, alternating with rotations of the shaft 127 each of one revolution.

The dog 149 will of course check the ring 154[b], by engaging one of its projections, after each release of the ring by the latch; but I prefer to provide an auxiliary spring stop 164 to act substantially in the same way and thus insure against the ring being dragged around by friction, or otherwise, with the effect of withdrawing the knife and so causing locking movement of latch 156 prematurely.

Ring 154 may be kept locked to member 151—152 by latch 157 by turning the keeper 165 into position to prevent the latch-controller moving into recess 162 under pressure of spring 163.

It will be noted that the advances of the bottles into position for filling and closure-affixing are the same, in point of time expended in performing them, whether the machine be adjusted for the filling of large or small bottles; only the intervening pauses are varied, according to the capacity-standard of the run of bottles being handled. A given number of bottles above the minimum size can therefore be handled in the present machine more quickly than in machines heretofore devised, wherein in order to handle bottles varying in capacity-standard pauses of the proper extent were obtained by changing the speed of the machine, *i. e.*, so that as the pauses were changed in extent so the time to make each advance was changed, and in the same proportion.

Operation: Upon each upstroke of the main slide the turret is advanced one stage to place one bottle under the syrup dispenser and one (already having its quantum of syrup) under the filling and sealing head 32. The parts carried by the main slide occupy at the full upstroke the positions shown in Fig. 13, at which time the closure chute registers with the closure inlet to the head 32, so that a closure has entered the inlet and rests against the plunger extension 43. When the head 32 descends the pawl 89 falls and supports the closures remaining in the chute. The descent of the main slide is accompanied by that of the piston 7—8 of the syrup dispensing pump, resulting in the way already described in the delivery of a charge of syrup to the bottle in position under its mouthpiece 17.

As explained, the gasket 64 is normally contracted (by springs 72) and when the plunger extension comes to rest in descending, on the bottle head the latter is centered, the impact is cushioned and a sealed joint is formed between the bottle and head 32 by the contact of the bottle mouth with the lower interior edge of the gasket which stands squeezed out as a lip by the parts 43 and 63 (Fig. 16). The plunger (and, of course, the compensating slide, which is supported on the plunger through spring 44) being now stationary, the main slide continues downward alone until, compensation being effected, the pawls 34 positively engage the compensating slide and push it downwardly a short distance relatively to the plunger against the resistance of spring 44, to wit, until the gasket has been depressed with reference to the bottle head to about the position shown in Fig. 17, whereupon, the rollers of levers 134 now having reached the surfaces 131[a] of cams 131, the main slide and compensating slide undergo the dwell, which will be augmented by the stopping of the cams if the filling time control is set for that purpose; this method of causing the bottle head to be received by the gasket, involving the constricting gasket sliding from one tubular part to another (extension 43 and the bottle head) that are approximately the same in exterior diameter, I find is superior to either of the usual methods consisting in contracting the gasket without interior resistance and then forcing it over the bottle head, or entering the bottle head into the gasket and then contracting it in that it saves wear and tear on the gasket and insures a more hermetic seal. While the compensating slide moves the short distance mentioned relatively to the plunger, the dog 58, as already described, causes pawl 50 to raise the valve spindle and open the valve 52 (Fig. 19) so that the filling of the bottle commences and spring-pressed hook 86 catches under shoulder 41[b] on the plunger. During the descent of the main slide, gate 90 has been closed by roller 100 traveling down slot 101, leaving pusher 92 repressed by the closure, which abuts closure extension 43 (Fig. 34). The closure inlet is thus sealed and when the gasket impinges against the bottle head the interiors of the bottle and head 32 form a space that is hermetically sealed excepting by way of chamber 46 and port 47, the object being to prevent loss of the pressure under which the liquid is to be stored in the bottle. In the filling, the liquid enters the bottle vortically, due to the screw 45, while the gas content (mainly air in the bottle and it may be some gas given off by the entering liquid) escapes through the passage of the liquid vortex, passing out through 45[b], 46 and 47. Port 47 is adjusted to a fine opening, so as to prevent loss of pressure before the bottle can be sealed, and since in practice I have found that an outlet restricted enough for this purpose may become clogged by the foam so that it will not function properly, I provide the screen or foraminous capsule 47[a], which acts to check the foam before it reaches the said outlet and yet between filling operations will, largely on account the area due to its capsule form, be cleared of foam at one or more points to allow an adequate fluid passage therethrough.

The bottle having been filled, the rollers of lever 134 leave the cam surfaces 131[a] and the dwell ceases; thereupon on the one hand shaft 135 is rocked from cam 132 to effect the recovery movement of the turret advancing crank *m*, through crank 136, and pressure on lever 84, through crank arm 132[b], and on lever 83, through crank arm 132[a], the said shaft then remaining at dwell (due to the non-spiral portion of cam 132 shown in Fig. 2) for a time, and on the other hand the final descending movement of the main and compensating slides is effected. Lever 84, actuated by crank arm 132[b], therefore causes through hook 86 a quick uplift of the plunger and closing of valve 52, as 50 clears 58, and the elevation of extension 43 clear of the waiting closure to allow the latter to be advanced to its seat by the pusher 92, and through lever 83 and dogs 81 the locking of the rod 75 in fixed relation to the machine frame. We have now the rod fast, but the main and compensating slides (locked together by the pawls 34) and the plunger descending, the plunger being held elevated in the compensating slide through hook 86 and lever 84 while the roller 85 on the latter runs down the (now stationary) vertically extending arm 132[b]. The downward progress of the parts mentioned brings the plunger extension against, and thereupon to exert yielding pressure upon, the closure now surmounting the bottle, and finally to force the closure-affixing appliance 66 downwardly over the closure and thereby attach it to the bottle head, the plunger of course yielding during this part of the operation; when, soon after its impact with the closure (then superimposed on the bottle head), the plunger has exerted sufficient pressure to establish a hermetic seal between the cork lining of the closure and the bottle head and thus permit opening of the interior of the head 32 to the atmosphere, lever 74, due to its movement with the head upon the (now fast) rod 75 as a fulcrum, cams down the mouth-piece 63 so that the gasket is relaxed and thus will slip freely down with the head over the bottle neck while dog 79 slips from the upper to the lower notch 80. During the last part of the downward movement the hook 86 (which is normally pressed against the plunger by spring 82, Fig. 32) is retracted by its shoe 86[a] wiping down against the beveled upper end of the rod 75, to be thus held until, as soon as the compensating slide again moves upward, it is above the point where it can catch on the shoulder 41[b] and thus by locking the compensating slide to the plunger prevent spring 44 from causing the plunger to eject the bottle as will appear.

The downstroke being completed, the main slide, compensating slide and plunger ascend. One result of the ascending movement is the resetting of the plunger to its normal position in the compensating slide, which involves ejectment of the bottle from the head 32, and another is the resetting of the compensating slide in its normal position in the main slide (flange 31[a] resting on the latter), the pawls 34 being wiped away from the teeth 33 by surface 35 as the main slide ascends. Meanwhile, shaft 135 is rocked to relieve the pressure on levers 84 and 83, and thus allow the hook to descend (relatively to the compensating slide) to its normal position (Fig. 13); to release the dogs 81 so that the rod 75 (still coupled with head 32 by dog 79 being engaged in lower notch 80) may rise and be reset by engaging with its shoulder 75[b] the lower bearing 76; and finally to cause the turret to be advanced one stage. To clear the closure inlet 67 for the reception of another closure the gate 90 is opened in the way already sufficiently stated.

The gasket is compressed by means which is yielding, due to springs 72. Thus the gasket can yield to accommodate irregularities in diameter of bottle heads.

Having thus fully described my invention, what I claim as new and desire to secure by Letters Patent is:—

1. In combination, means to operate on the containers, means to place the containers successively in operative relation to the first means, and mechanism to advance the second means substantially constant distances including a continuously driving means and an alternating advance-and-dwell-motion power transmitting means operatively connecting the second means with said driving means and having means to change the ratio of the time-intervals of its advances and dwells independently of said driving means while maintaining substantially constant the advance-increments of the second means.

2. In combination, reciprocating means to operate on the containers, means to place the containers successively in operative relation to the first means, and mechanism to advance the second means substantially constant distances including a continuously driving means and an alternating advance-and-dwell-motion power transmitting means operatively connecting the second means with said driving means and having means to change the ratio of the time-intervals of its advances and dwells independently of said driving means while maintaining substantially constant the advance-increments of the second means.

3. In combination, means to deliver a charge to the containers, means to place the containers successively in operative relation to the first means, and mechanism to advance the second means substantially constant distances including a continuously driving means and an alternating advance-and-dwell-motion power transmitting means operatively connecting the second means with said driving means and having means to change the ratio of the time-intervals of its advances and dwells independently of said driving means while maintaining substantially constant the advance-increments of the second means.

4. In combination, means to operate intermittently on the containers, means to place the containers successively in operative relation to the first means, a continuously driving means, and an alternating advance-and-dwell-motion power transmitting means operatively connecting the first means with said driving means and having means to change the ratio of the time intervals of its advances and dwells independently of said driving means.

5. In combination, reciprocating means to operate intermittently on the containers, means to place the containers successively in operative relation to the first means, a continuously driving means, and an alternating advance-and-dwell-motion power transmitting means operatively connecting the first means with said driving means and having means to change the ratio of the time intervals of its advances and dwells independently of said driving means.

6. In combination, means to intermittently deliver a charge to the containers, means to place the containers successively in operative relation to the first means, a continuously driving means, and an alternating advance-and-dwell-motion power transmitting means operatively connecting the first means with said driving means and having means to change the ratio of the time intervals of its advances and dwells independently of said driving means.

7. In combination, means to operate on the containers, a container-advancer movable relatively to the first means, a continuously driving means, and an alternating advance-and-dwell-motion power transmitting means operatively connecting the first means and the container-advancer with the driving means and having means to change the ratio of the time-intervals of its advances and dwells independently of said driving means.

8. In combination, reciprocating means to operate on the containers, a container-advancer movable relatively to the first means, a continuously driving means, and an alternating advance-and-dwell-motion power transmitting means operatively connecting the first means and the container-advancer with the driving means and having means to change the ratio of the time-intervals of its advances and dwells independently of said driving means.

9. In combination, valved means to deliver a charge to the containers, a container advancer movable relatively to the first means, a continuously driving means, and an alternating advance-and-dwell-motion power transmitting means controlling the valve and operatively connecting the container-advancer with the driving means and having means to change the ratio of the time-intervals of its advances and dwells independently of said driving means.

10. In combination, means to exert a container-mouth-housing slipping thrust on the container having means to effect a variable dwell during such thrust, and means to operate on the housed container mouth during the dwell.

11. In combination, means to exert a container-mouth-housing slipping thrust on the container having means to effect a variable dwell during such thrust, and means to introduce a fluid to the housed container mouth during said dwell.

12. Coacting means to exert pressure on the container interposed between them, one having a filling-head and also having container-actuated means, including a normally closed valve openable away from the container, for controlling the liquid flow through the head, in combination with means to admit fluid to the head.

13. Coacting means to exert pressure on the container interposed between them, one having a filling-head and also having container-actuated means, for controlling the liquid flow through the head, in combination with means to admit fluid to the head, said controlling means including a differentially movable container-actuated fluid-delivery member and a normally closed valve therefor openable away from the container.

14. Coacting means to exert pressure on the container interposed between them, one having a filling-head and also having container-actuated means, movable within the head longitudinally of the pressure-thrust of said means, for controlling the fluid flow through the head, in combination with means to admit fluid to the head and closure-affixing means in the head relatively to which said controlling means is movable.

15. Coacting means to exert pressure on the container interposed between them, in combination with means to conduct fluid to the container having a part thereof movable in one of said coacting means and actuable by the container, a valve to control the fluid flow through said part, and means to cause differential movement of said valve on movement of said part.

16. Coacting means to exert closure-affixing pressure on a container and its closure interposed between them, in combination with means to conduct fluid to the container having the delivery part thereof controlling the flow of said fluid to the container and movable in one of said coacting means longitudinally of the pressure thrust line and actuable by the container, and a closure-affixing appliance in said last-named means penetrated by said member.

17. Coacting means to exert pressure on the container interposed between them including a tubular plunger yieldable to the container in one of said coacting means, means to supply a fluid to said plunger for delivery therefrom to the container, a normally closed valve in the plunger controlling the flow therethrough and openable away from the container, and means to cause movement of the valve on movement of the plunger in the one of said coacting means in which it is yieldable.

18. Coacting means to exert pressure on the container and its superimposed closure interposed between them including a tubular plunger yieldable to the container in one of said coacting means, means to supply a fluid to said plunger for delivery therefrom to the container, a valve in the plunger controlling the flow therethrough, means to cause movement of the valve on movement of the plunger in the one of said coacting means in which it is yieldable, and a closure affixing appliance in the last-named one of said coacting means.

19. Coacting means to exert closure-affixing pressure on a container and its closure interposed between them, one of said means including means to conduct a fluid into the container mouth having a part thereof impingible by the container-mouth and thereupon movable away from the container in the means including said part to permit introduction of a closure between said part and the container, the last-named means also including means to affix the introduced closure to the container mouth.

20. Coacting means to exert closure-affixing pressure on a container and its closure interposed between them, one of said means including means to conduct a fluid into the container mouth having the delivery part thereof impingible by the container-mouth and thereupon movable away from the container in the means including said part to permit introducing of a closure between said part and the container, the last-named means also including means to affix the introduced closure to the container mouth.

21. Coacting means to exert closure-affixing pressure on a container and its closure interposed between them, one of said means including means to conduct a fluid into the container mouth having a part thereof impingible by the container-mouth and thereupon movable away from the container in the means including said part to permit introduction of a closure between said part and the container, the last-named means also including means, penetrated by said part, to affix the introduced closure to the container mouth.

22. In combination, a closure-receiving head, a container-thrust-assuming fluid-delivery plunger in the head, a closure-affixing means in the head, means to move the container and head one toward the other to bring the container and plunger in impingement with each other for delivery of the fluid and subsequently affix the closure, means to move the plunger clear of the container after such impingement, and means to introduce a closure between the container and affixing means after such movement of the plunger clear of the container.

23. In combination, a closure-receiving head, a yielding-container-thrust-assuming fluid-delivery plunger in the head, a closure-affixing means in the head, means to move the container and head one toward the other to bring the container and plunger in fluid delivery relation to each other, thereupon hold the container and head at dwell and thereupon continue such movement, means to move the plunger from the container and means to thereupon introduce a closure between the container and affixing means, the affixing means being adapted to affix the closure during the the movement of the container and head one toward the other following said dwell.

24. In combination, a closure-receiving head having a lateral closure inlet, a container-thrust-assuming fluid-delivery plunger in the head normally obstructing the inlet and vertically movable to clear the same, a closure-affixing appliance in the head, means to move the container and head one toward the other to bring the container and plunger in impingement with each other for delivery of the fluid and subsequently affix the closure, and means to move the plunger clear of the inlet to admit the closure to be affixed between such impingement and the affixing of the closure.

25. A means to receive a bottle neck or like container-mouth-portion and thereupon deliver a fluid thereinto including an elastic gasket adapted directly to receive such mouth-portion and a container-mouth thrust-assuming plunger extending through the gasket from one side thereof to at least proximity to the opposite side and withdrawable into the gasket and having a diameter approximating the external diameter of said mouth-portion, said gasket exerting constricting pressure on the plunger.

26. Means to receive the impact of and thereupon deliver a fluid into a container mouth including an elastic gasket, means to hold a part of the gasket in one plane thereof transversely of its axis squeezed to reduced diameter, in combination with means to force the first means and the container together and bring the container mouth against the thus reduced part of the gasket.

27. Means to receive the impact of and thereupon deliver a fluid into a container mouth including an elastic gasket, means to hold a part of the gasket in one plane thereof transversely of its axis squeezed into the form of a projecting lip, in combination with means to force the first means and the container together and bring the container mouth against the said lip.

28. Means to receive the impact of and thereupon deliver a fluid into a container including an elastic gasket, a plunger extending through the gasket from one side nearly to but short of the opposite side thereof, the gasket forming a container-mouth centering cushion at its latter side and immediately around its opening, in combination with means to force the first means and the container together to bring the container mouth against the said cushion and the plunger.

29. A means to receive the impact of and thereupon deliver a fluid into a container mouth including an elastic gasket and means to hold the gasket squeezed to a less internal diameter at one plane than at others transversely of the gasket's axis including a fluid delivery device penetrating the gasket.

30. A means to receive the impact of and thereupon deliver a fluid into the container mouth including an elastic gasket, a tubular fluid delivery member extending only part way through the gasket, and constricting means for the gasket squeezing the part thereof not penetrated by said member inwardly as a projecting container-mouth-impact-receiving lip.

31. A means to receive the impact of and thereupon deliver a fluid into the container mouth including an elastic gasket, a tubular container-impact receiving fluid delivery member extending only part way through the gasket, and constricting means for the gasket squeezing the part thereof not penetrated by the member inwardly as a projecting container-mouth-impact-receiving lip, said member being retractable into the gasket.

32. In combination, a supporting structure for the container, a fluid-conducting structure having a passage for the fluid, said passage being adapted to receive the container, a container-closing appliance in said passage, a constrictable gasket also in said passage nearer to the supporting structure than said appliance, means to move one structure toward the other to telescope the container into said passage, and releasable means to hold the gasket constricted during such movement.

33. In combination, a supporting structure for the container, a fluid-conducting structure having a passage for the fluid, said passage being adapted to receive the container, a container-closing appliance in said passage, a constrictable gasket also in said passage nearer to the supporting structure than said appliance, means to move one structure toward the other to telescope the container into said passage, releasable means to hold the gasket constricted during such movement, and means to cause the last-named means to hold the gasket after the container becomes telescoped into said passage.

34. In combination, a supporting structure for the container, a fluid-conducting passaged structure, means to move the latter toward the other structure to telescope the container into the passaged structure, a container closing appliance in the passaged structure, a constrictable gasket also in the passaged structure nearer to the supporting structure than said appliance, means movable with the passaged structure normally holding the gasket constricted, and means to cause the last-named means to release the gasket after the container becomes telescoped into said structure.

35. In combination, a machine frame, a movable-fluid conducting passaged structure arranged therein, means to form a seal around the container mouth having an actuating member movable with and in said structure, and releasable means to hold said member against movement with said structure.

36. A fluid conducting passaged structure having means to form a seal around the container mouth and also having a chamber to receive the fluid evicted from the container by the fluid entering the same and a restricted outlet from said chamber, in combination with a foraminous foam-retarder in said chamber separating the part of the chamber having the outlet from the remainder thereof.

37. A fluid conducting passaged structure having means to form a seal around the container mouth and also having a chamber to receive the fluid evicted from the container by the fluid entering the same and a restricted outlet from said chamber, in combination with a foraminous foam-retarding capsule in said chamber covering the outlet.

38. In combination, a tubular fluid dispenser, means to bring the container and dispenser into fluid-transferring relation to each other, the dispenser having a normally closed container-opened valve, and a pump having a yielding pump element to force a fluid under pressure into the dispenser during the working stroke of the pressure-exerting means.

39. In combination, a tubular fluid dispensing means, opposite supports, one carrying the dispensing means and the other having means to support the container, one of said means being yieldable in its support, means to move one support toward the other to bring the container and dispensing means into fluid-transferring relation to each other, said dispensing means having a closed container-opened valve, and means to force a fluid under yielding pressure into the dispenser during the working stroke of the pressure-exerting means.

40. In combination, a pump, a tubular fluid delivery means leading from the pump and having a normally closed container-opened valve, coacting pressure-exerting means one movable toward the other and one being adapted to support the container and the other carrying the discharge end portion of the delivery means, and means to effect pressure strokes of the pump and said pressure-exerting means at substantially the same time.

41. In combination, a pump adapted to impose yielding pressure on the fluid, a tubular fluid delivery means leading from the pump and having a normally closed container-opened valve, coacting pressure-exerting means one movable toward the other and one being adapted to support the container and the other carrying the discharge end portion of the delivery means, and means to effect pressure strokes of the pump and said pressure-exerting means at substantially the same time.

42. In combination, a pump adapted to impose yielding pressure on the fluid, a tubular fluid delivery means leading from the pump and having a normally closed container-opened valve, opposite supports, one carrying the discharge end portion of the delivery means and the other having means to support the container, one of said means being yieldable in its support, and means to move one of said supports toward the other and effect a pressure stroke of the pump substantially at the same time.

43. In combination, a pump, a tubular fluid delivery means leading from the pump and having a normally closed container-opened valve, a check valve in said means between the first valve and pump and opening away from the pump, and coacting pressure-exerting means one movable toward the other and one being adapted to support the container and the other carrying the discharge end portion of the delivery means.

44. Means to deliver a fluid into a container including an elastic container-receiving gasket, means to force the first means and container together and telescope the container into the gasket, and yielding means to hold the gasket contracted at the time of telescoping the container thereinto.

45. In combination, opposed means, movable one toward the other for bringing the container and closure into sealed union with each other, one of said opposed means having means on the working stroke first to form a fluid transferring connection with and then to affix the closure to the container, and a variable-dwell-motion means for moving the movable one toward the other of said opposed means, the dwell thereof being timed to occur between the forming of said connection and the affixing of the closure.

46. Coacting pressure-exerting means to affix a closure to a container interposed between them, one of said means including a part impingible by the container and yieldable longitudinally of the pressure thrust line, and means to move said part after the impingement away from the container in the means including said part to permit introducing of a closure between said part and the container.

47. Coacting pressure-exerting means to affix a closure to a container member interposed between them, one of said means including a thrust-assuming member impingible by the container member and yieldable longitudinally of the pressure thrust line, and means to move one of said members after the impingement away from the other to permit introducing of a closure between said members.

48. Coacting pressure-exerting means to affix a closure to a container interposed between them, one of said means including a part impingible by the container and yieldable longitudinally of the pressure thrust line, means to move said part away from the container in the means including said part to permit the introduction of a closure between said part and the container, and means to hold the closure pressing against said part in a plane which will be between the container and said part after said movement of the latter.

49. Coacting pressure-exerting means to affix a closure to a container member interposed between them, one of said means including a thrust-assuming member impingible by the container member and yieldable longitudinally of the pressure thrust line, means to hold the closure pressing laterally against one of said members, and means to move the last-named member away from the other and clear of the closure to permit the introduction of the latter between said members.

50. In combination, a closure-receiving head having a lateral closure inlet, a plunger in the head obstructing the inlet and movable to clear the same, a closure-affixing appliance in the head above the inlet, means to move the container and head one toward the other to enter the container into the head and into impingement with the plunger and later cause the affixing appliance to affix a closure to the container, and means to elevate the plunger, upon impingement thereof by the container, clear of the latter to permit introduction of the closure.

51. In combination, a closure-receiving head having a lateral closure inlet, a plunger in the head obstructing the inlet and movable to clear the same, a closure-affixing appliance in the head above the inlet, means to move the container and head one toward the other to enter the container into the head and into impingement with the plunger and later cause the affixing appliance to affix a closure to the container, means to elevate the plunger, upon impingement thereof by the container, clear of the latter to permit introduction of the closure, and means to hold a closure pressing laterally against the plunger at the inlet.

52. In combination, coacting means to exert pressure on a container and its closure interposed between them, a container closing appliance in one of them, and means to intermittently oppose resistance to the container at the mouth end thereof during the thrust of one of said means toward the other.

53. In combination, coacting means to exert pressure on a container and its closure interposed between them, a container closing appliance in one of them, a container-resisting cushioned plunger in the latter means, and means to temporarily retract the plunger out of pressure-exerting relation to the container during the thrust of one of said means toward the other.

54. In combination, a closure-receiving head having a sealing throat and a lateral closure inlet leading to the throat, a container-thrust-assuming plunger within the throat impingible laterally by a closure in the inlet and movable to clear the latter and said closure, and a closure-affixing appliance in the head.

55. In combination, a closure-receiving head having a lateral closure inlet, a container-thrust-assuming plunger in the head normally obstructing the inlet and vertically movable to clear the same, a closure-affixing appliance in the head, means to move the container and head one toward the other to enter the container in the head and in impingement with the plunger and thereupon affix the closure, and means to move the plunger clear of the inlet while the container is entered in the head to admit the closure to be affixed.

56. In combination, coacting pressure-exerting means to affix a closure to a container interposed between them, one having a plunger yieldable to the container from the other means, and means to retract the plunger on the pressure movement of one of said coacting means relatively to the other including a lever on one and engageable with the other of them.

In testimony whereof I affix my signature.

AMOS CALLESON.

Copies of this patent may be obtained for five cents each, by addressing the "Commissioner of Patents, Washington, D. C."